(12) United States Patent
Adams

(10) Patent No.: US 6,912,988 B2
(45) Date of Patent: Jul. 5, 2005

(54) MULTIPLE-FRONT COMBUSTION CHAMBER SYSTEM WITH A FUEL/AIR MANAGEMENT SYSTEM

(76) Inventor: Joseph S. Adams, 481 Beaver Point Road, Salt Springs Island (CA), V8K 2J9

(*) Notice: Subject to any disclaimer, the term of this patent is extended or adjusted under 35 U.S.C. 154(b) by 0 days.

(21) Appl. No.: 10/760,921

(22) Filed: Jan. 20, 2004

(65) Prior Publication Data

US 2004/0144357 A1 Jul. 29, 2004

Related U.S. Application Data

(60) Provisional application No. 60/442,402, filed on Jan. 24, 2003.

(51) Int. Cl.[7] ............................................. F02B 19/00
(52) U.S. Cl. ....................... 123/256; 123/260; 123/274; 123/281; 123/663
(58) Field of Search .................................. 123/256, 258, 123/260, 281, 283, 286, 293, 662, 663, 274, 275

(56) References Cited

U.S. PATENT DOCUMENTS

| | | | | |
|---|---|---|---|---|
| 1,008,059 A | * | 11/1911 | Phillips | 123/293 |
| 1,843,672 A | * | 2/1932 | Haltenberger | 123/663 |
| 1,854,979 A | * | 4/1932 | Bullington | 123/293 |
| 2,735,413 A | * | 2/1956 | Meyer et al. | 123/286 |
| 4,043,248 A | | 8/1977 | Bulman et al. | |
| 4,377,991 A | | 3/1983 | Liesse | |
| 4,404,938 A | * | 9/1983 | Nikolic | 123/256 |
| 4,616,622 A | | 10/1986 | Milliman | |
| 4,665,868 A | | 5/1987 | Adams | |
| RE32,452 E | | 7/1987 | Nikolich | |
| 4,759,318 A | | 7/1988 | Adams | |
| 5,125,320 A | | 6/1992 | Zielinski | |
| 5,199,626 A | | 4/1993 | Terayama et al. | |
| 5,257,614 A | | 11/1993 | Sullivan | |

(Continued)

FOREIGN PATENT DOCUMENTS

| | | |
|---|---|---|
| JP | 60104806 | 6/1985 |
| JP | 4136696 | 5/1992 |
| JP | 5215492 | 8/1993 |
| JP | 6185894 | 7/1994 |

OTHER PUBLICATIONS

English language abstract of Japanese patent JP4136696.
English language abstract of Japanese patent JP5215492.
English language abstract of Japanese patent JP6185894.
English language abstract of Japanese patent JP60104806.

Primary Examiner—Tony M. Argenbright
(74) Attorney, Agent, or Firm—Thomas B. Ryan; Brian B. Shaw, Esq.; Harter, Secrest & Emery LLP

(57) ABSTRACT

A combustion chamber of a positive-displacement spark-ignited internal combustion engine is divided into a main combustion chamber and a pre-combustion chamber having proximal and distal ends. The proximal end is connected to the main combustion chamber and a spark-ignition device is located at the distal end. Within the pre-combustion chamber, a plurality of passageways extend between its proximal and distal ends so that a flame front ignited by the ignition device at the distal end of the pre-combustion chamber propagates along the plurality of passageways as separate flame fronts toward the proximal end of the pre-combustion chamber. A displacer separates a premixing chamber from the pre-combustion and main combustion chambers. The displacer is relatively moveable for transferring the charge of fuel and air from the premixing chamber into the pre-combustion main combustion chambers.

52 Claims, 12 Drawing Sheets

U.S. PATENT DOCUMENTS

| | | |
|---|---|---|
| 5,333,594 A | 8/1994 | Robinson |
| 5,499,567 A | 3/1996 | Gay |
| 5,540,194 A | 7/1996 | Adams |
| 5,613,483 A | 3/1997 | Lukas et al. |
| 5,769,066 A | 6/1998 | Schneider |
| 5,771,621 A | 6/1998 | Rogers |
| 5,771,875 A | 6/1998 | Sullivan |
| 5,967,133 A | 10/1999 | Gardner, Jr. |
| 6,003,504 A | 12/1999 | Rice et al. |
| 6,138,656 A | 10/2000 | Rice et al. |
| 6,233,928 B1 | 5/2001 | Scott |
| 6,343,599 B1 | 2/2002 | Perrone |
| 6,371,099 B1 | 4/2002 | Lee |
| 6,418,920 B1 | 7/2002 | Marr |
| 6,474,326 B1 | 11/2002 | Smith et al. |
| 6,491,002 B1 | 12/2002 | Adams |
| 6,634,325 B1 | 10/2003 | Adams |
| 6,647,969 B1 | 11/2003 | Adams |
| 2002/0088449 A1 | 7/2002 | Perrone |
| 2003/0005918 A1 | 1/2003 | Jones |
| 2003/0110758 A1 | 6/2003 | Adams |
| 2003/0131809 A1 | 7/2003 | Adams |

\* cited by examiner

US 6,912,988 B2

MULTIPLE-FRONT COMBUSTION CHAMBER SYSTEM WITH A FUEL/AIR MANAGEMENT SYSTEM

CROSS-REFERENCE TO RELATED APPLICATIONS

Priority is claimed to Provisional Application No. 60/442,402, filed 24 Jan. 2003, the disclosure of which is hereby incorporated by reference.

BACKGROUND OF THE INVENTION

1. Field of the Invention

The invention relates to combustion chamber systems for positive-displacement spark-ignited internal combustion engines and to displacement-type scavenging and charging systems for the purpose of replacing fuel/air mixes in the combustion chamber.

2. Description of Related Art

Positive-displacement spark-ignited internal combustion engines benefit by limiting the period of time between a spark ignition and a peak pressure obtained from burning fuel. In crankshaft-type engines, rapid combustion assures that more of the fuel can be burned after the top-dead-center piston position, resulting in additional horsepower and more efficient consumption of fuel. In linear engines, such as may be used for fastening tools, rapid combustion allows for faster operation of the tools and less of a lag between the operator pulling a trigger and the fastener being driven. Shorter combustion times also prevent pre-expansions of the combustion chamber such as by early movement of a power piston until combustion pressures reach higher magnitudes. As a result, higher velocities can be communicated to the power piston for driving fasteners.

One way of achieving the higher burn rates is to induce turbulence of the fuel-air mixture in the combustion chamber. Such turbulence is known to shorten ignition-to-peak-pressure time while boosting peak pressures. A fan or other moving element can be located within combustion chambers to induce turbulence prior to ignition.

Higher peak combustion pressure from a given amount of fuel at a given compression can also be obtained by dividing the combustion chamber into a pre-combustion chamber and a main combustion chamber that are ignited in sequence. A spark igniter located at one end of the pre-combustion chamber remote from the main combustion chamber ignites a fuel-air mix in the pre-combustion chamber. A flame front ignited at the remote end of the pre-combustion chamber propagates toward the main combustion chamber, pushing a mixture of fuel and air into the main combustion chamber in advance of its arrival. Both turbulence and increased pressure are created in the fuel-air mixture of the main combustion chamber, which is ignited upon arrival of the flame front from the pre-combustion chamber.

My U.S. Pat. No. 6,840,033 for a Combustion Chamber System discloses various configurations of a pre-combustion chamber, including curved pre-combustion chambers that are believed to increase flame-front speed and to shorten ignition-to-peak-pressure time with respect to straight pre-combustion chambers of the same cross-sectional dimension. The peak combustion pressure is affected by the volume of the fuel-air mix in the combustion chamber. Adding to the length of the pre-combustion chamber can increase this volume. However, the added length can increase the ignition-to-peak-pressure time. In other words, if the flame fronts are required to traverse greater lengths, more time is required. In some designs, it was taking up to fourteen milliseconds at atmospheric pressure to obtain peak pressure.

Combustion efficiency is also dependent upon the quality of charge (i.e., fuel/air mix) in the combustion chamber. Between each firing, exhaust gases must be removed from the combustion chamber and a fresh charge introduced into the combustion chamber. To more completely remove the exhaust gases, it is preferable for the exhaust gases be mechanically displaced from the combustion chamber by reducing the volume of the combustion chamber to substantially zero prior to the introduction of a fresh charge.

U.S. Pat. No. 4,377,991 to Liesse entitled Internal Combustion Apparatus discloses the use of a plunger within the combustion chamber, which functions to expel unwanted exhaust gases at one side of the plunger while drawing in a fresh charge on the other. When released under a spring force, the fresh charge is transferred from one side of the plunger to the other through passageways that create turbulence. On one side of the plunger is a pre-mixing chamber, and on the other side of the plunger is the combustion chamber. Movement of the plunger in a direction that collapses the combustion chamber positively displaces exhaust gases from the combustion chamber while drawing fresh air and fuel into the expanding pre-mixing chamber. Movement of the plunger in the opposite direction transfers the fresh charge from the collapsing pre-mixing chamber into the expanding combustion chamber. The plunger is manually activated by depressing a push button.

BRIEF SUMMARY OF THE INVENTION

My invention in one or more of its embodiments improves combustion systems of positive-displacement, spark-ignited, internal combustion engines and is of particular benefit to gas-powered linear engines of this type. The improvements include shortening the time between a spark ignition and the peak pressure obtained by combustion, boosting peak combustion pressures, and improving fuel efficiency. Other embodiments of the invention feature a fuel/air management system that produces additional turbulence within the combustion chamber and provides for the mechanical displacement of exhaust gases from the combustion chamber, which can improve overall performance of the engines.

One embodiment of the invention includes a multiple-front combustion chamber system for a positive-displacement, spark-ignited, internal combustion engine. The system includes a main combustion chamber and a pre-combustion chamber having proximal and distal ends. The proximal end of the pre-combustion chamber is connected to the main combustion chamber, and a spark-ignition device is located at the distal end of the pre-combustion chamber. A plurality of passageways are formed in the pre-combustion chamber between its proximal and distal ends so that a flame front ignited by the ignition device at the distal end of the pre-combustion chamber propagates along the plurality of passageways as separate flame fronts toward the proximal end of the pre-combustion chamber.

Preferably, each of the plurality of passageways has a length and a limited transverse dimension for propagating separate wavefronts along their respective lengths. A fuel injection system can be used for creating charges of fuel and air within the passageways of the pre-combustion chamber. The limited transverse dimensions of the passageways provide for maintaining orderly flame fronts so that the flame fronts push unburned portions of the charges into the main combustion chamber preceding their arrival at the main combustion chamber.

The plurality of passageways can include first and second passageways having substantially equal lengths measured between the distal and proximal ends of the pre-combustion chamber, so that the separate flame fronts propagating along their respective lengths arrive together at the main combustion chamber. The plurality of passageways contribute to an increased volume of the pre-combustion chamber while limiting a length of travel for the flame fronts between the distal and proximal ends of the pre-combustion chamber. At least one wall separates the first and second passageways along corresponding portions of their respective lengths. The same wall can be used to separate the pre-combustion chamber from the main combustion chamber. For example, the wall can be shaped as an annular wall surrounding the main combustion chamber. The first and second passageways are formed as arcuate paths wrapping in opposite directions around the main combustion chamber. A spark-igniter is located at the start of the two arcuate pathways, and an opening through the annular wall into the main combustion chamber is located at a common end of the arcuate pathways.

The combustion chamber system can also be arranged to include a pre-mixing chamber for mixing a charge of fuel and air and a displacer preferably in the form of a mixing piston that separates the pre-mixing chamber from at least one of the pre-combustion chamber and the main combustion chamber. The mixing chamber is adapted to receive both fuel and air. The displacer is preferably moveable in a first direction for drawing air into the mixing chamber and is moveable in a second direction for transferring the charge of fuel and air into at least one of the pre-combustion chamber and the main combustion chamber.

The movement of the displacer in the first direction can be arranged to increase a volume of the pre-mixing chamber and to decrease a collective volume of the pre-combustion and main combustion chambers for forcing exhaust gases from the collective volume of the pre-combustion and main combustion chambers. The collective volume of the pre-combustion chamber and the main combustion chamber is preferably reduced to near zero to mechanically displace the exhaust gases from both combustion chambers.

The movement of the displacer in the second direction can be arranged to increase the collective volume of the pre-combustion and main combustion chambers and to decrease the volume of the pre-mixing chamber. While the collective volume of the combustion chambers is being restored by movement of the displacer in the second direction, a clean charge of fuel and air is transferred from the pre-mixing chamber into the pre-combustion and combustion chambers. A wall or other physical feature that separates the pre-combustion and main combustion chambers occupies a portion of their collective volume. The volume displaced from the pre-mixing chamber by movement of the displacer in the second direction exceeds the additional volume made available in the pre-combustion and combustion chambers by this amount. This extra volume can be used for such purposes as to slightly compress the charge in the pre-combustion and main combustion chambers, to compensate for pumping losses during the transfer of charge, or to scavenge any exhaust gases that may be left over from a previous cycle.

Another embodiment of the invention as a positive-displacement, spark-ignited displacement, internal combustion engine apparatus includes a combustion chamber having a wall that divides the combustion chamber into a pre-combustion chamber and a main combustion chamber. The main combustion chamber communicates with a positive-displacement power-transmitting device such as a power piston for transferring power from the engine. The pre-combustion chamber is located externally of the main combustion chamber. An opening in the dividing wall connects the pre-combustion chamber to the main combustion chamber. A spark-ignition source is located in the pre-combustion chamber remote from the opening in the wall. The pre-combustion chamber contains a plurality of passageways between the speak-ignition source and the opening in the wall for conveying a corresponding plurality of combustion fronts along different routes to the combustion chamber.

Preferably the plurality of passageways meet at the opening in the wall connecting the pre-combustion chamber to the main combustion chamber. The plurality of passageways also preferably meet at the spark-ignition source. However, the passageways preferably take different routes between the spark-ignition source and the opening in the wall. The different routes can be curved to increase flame front speed along their lengths. In one configuration, the pre-combustion chamber surrounds the main combustion chamber, and a first of the passageways extends from the spark-ignition source in one direction around the main combustion chamber and a second of the passageways extends from the spark-ignition source in the opposite direction around the main combustion chamber. Flame fronts propagating along the two passageways approach the opening in the wall from opposite directions. A collision of the charges pushed in advance of the flame fronts at the opening is expected to increase turbulence within the main combustion chamber.

Another embodiment of the invention includes a fuel-air management system for an internal combustion engine. The management system includes a pre-combustion chamber for initiating combustion and a main combustion chamber for furthering combustion to generate output power for the engine. A pre-mixing chamber is provided for mixing a charge of fuel and air. A displacer separates the pre-mixing chamber from at least one of the pre-combustion chamber and the main combustion chamber. Movement of the displacer transfers the charge of fuel and air from the pre-mixing chamber into at least one of the pre-combustion chamber and the main combustion chamber.

The preferred displacer is moveable in a first direction for drawing air into the pre-mixing chamber and is moveable in a second direction for transferring the charge of fuel and air into at least one of the pre-combustion chamber and the main combustion chamber. The movement of the preferred displacer in the first direction increases a volume of the pre-mixing chamber and decreases a collective volume of the pre-combustion and main combustion chambers for forcing exhaust gases from the collective volume. Movement of the preferred displacer in the first direction also opens an exhaust valve for discharging exhaust gases from the collective volume of the pre-combustion and main combustion chambers.

Additional features of the preferred fuel-air management system include an opening between the pre-combustion chamber and the main combustion chamber, a check valve that restricts flows from the main combustion chamber to the pre-combustion chamber, and exhaust passages that allow the discharge of exhaust gases from the pre-combustion chamber and the main combustion chamber independently of the opening between the pre-combustion chamber and the main combustion chamber. Movement of the preferred displacer in the first direction forces exhaust gases through the exhaust passages from both the pre-combustion chamber and the main combustion chamber.

A wall separating the pre-combustion chamber and the main combustion chamber can be moved together with the displacer. Movement of the wall together with the displacer in the first direction decreases a collective volume of the pre-combustion chamber and the main combustion chamber. The exhaust valve is preferably opened and closed in accordance with the movement of the wall for discharging the gases from the collective volume of the pre-combustion and main combustion chamber. The wall occupies a portion of the collective volume of the pre-combustion and combustion chambers so that the reduction in volume of the mixing chamber affected by movement of the displacer in the second direction is larger than the increase in the collective volume of the pre-combustion and main combustion chambers affected by the same movement of the displacer.

The transfer of fuel and air into a smaller space allows a portion of the charge to be used for a variety of purposes. For example, the additional charge can be used to increase the pressure in the collective volume of the pre-combustion and main combustion chambers or to force any remaining exhaust gases from the combined volume. In addition, the excess charge can be used to compensate for inefficiencies in the pumping action of the displacer, which can be exploited as a cost savings measure.

The invention is also embodied in a recharging system for an internal combustion engine. The recharging system includes a mixing chamber for mixing a charge of fuel and air, a combustion chamber for combusting the charge of fuel and air, and a displacer that separates the mixing chamber from the combustion chamber. The displacer is relatively moveable in a first direction for increasing a volume of the mixing chamber and decreasing a volume of the combustion chamber. The displacer is moveable in a second direction for decreasing the volume of the mixing chamber and increasing the volume of the combustion chamber. The relative movement of the displacer in the second direction transfer the charge of fuel and air from the mixing chamber into the combustion chamber. The decrease in volume of the mixing chamber exceeds the increase in volume of the combustion chamber as a result of the relative movement of the displacer in the second direction.

A barrier preferably divides the combustion chamber into a pre-combustion chamber and a main combustion chamber. The barrier occupies a portion of the volume of the combustion chamber. The increase in volume of the combustion chamber resulting from the relative movement of the displacer in the second direction is reduced with respect to the decrease in the volume of the mixing chamber resulting from the same relative movement of the displacer by the volume occupied by the barrier within the volume of the combustion chamber.

Preferably, the mixing chamber and the combustion chamber share a common volume defined within a cylinder head. The displacer divides the shared volume of the cylinder head between the pre-mixing chamber and the combustion chamber. Movement of the displacer with respect to the cylinder head redistributes the shared volume between the pre-mixing chamber and the combustion chamber. A portion of the available space on the combustion chamber side of the displacer is occupied by the barrier that divides the combustion chamber into a pre-combustion chamber and a main combustion chamber. When the displacer is moved in a direction that redistributes more of the shared volume into the combustion chamber, the increase in the available space within the combustion chamber is less than the decrease in the space of the mixing chamber because of the space occupied by the barrier. The excess charge can be used for several purposes. For example, the excess charge can be confined within the relatively reduced volume of the combustion chamber for increasing the pressure of the charge within the combustion chamber. An exhaust valve for discharging exhaust gases from the combustion chamber can be linked to an initial relative movement of the displacer in the second direction so that the transfer of a portion of the charge into the combustion chamber performs a scavenging function for more completely discharging the exhaust gases from the combustion chamber.

A valve system is preferably used between the mixing chamber and the combustion chamber to permit fluid transfers from the mixing chamber to the combustion chamber but prevents fluid transfers from the combustion chamber to the mixing chamber. The excess charge can be used to accommodate losses in the valve system so that the charge transferred into the combustion chamber remains at or above atmospheric pressure.

BRIEF DESCRIPTION OF THE SEVERAL VIEWS OF THE DRAWING(S)

Figure 7:
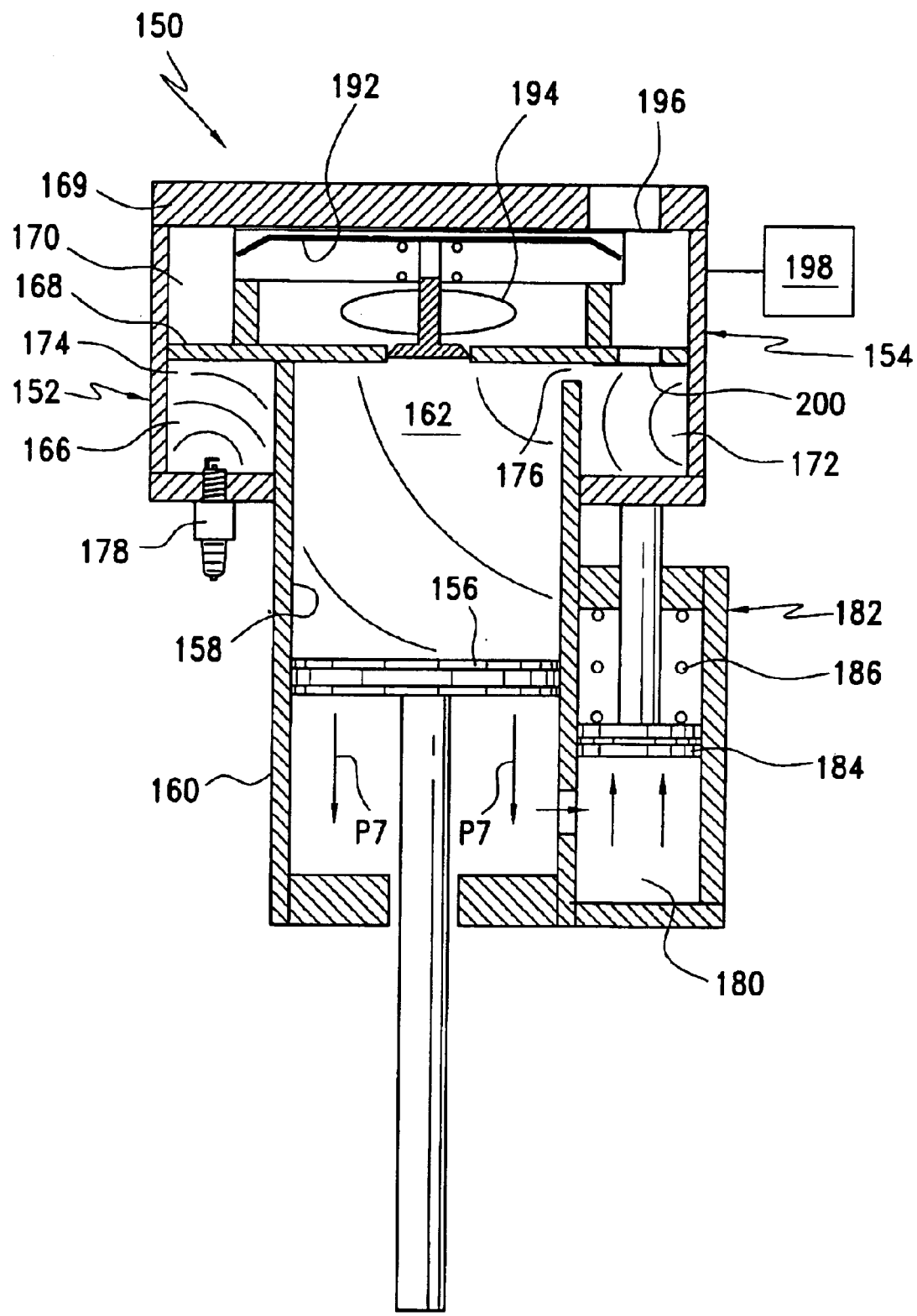

FIG. 7 is a schematic side cross-sectional view of a fuel/air management system for an internal combustion engine having a cylinder head that is moveable with respect to a cylinder for relatively moving a displacer that divides a shared volume within the cylinder head between a pre-mixing chamber and a combustion chamber, which is itself divided between a pre-combustion chamber and a main combustion chamber.

Figure 8:
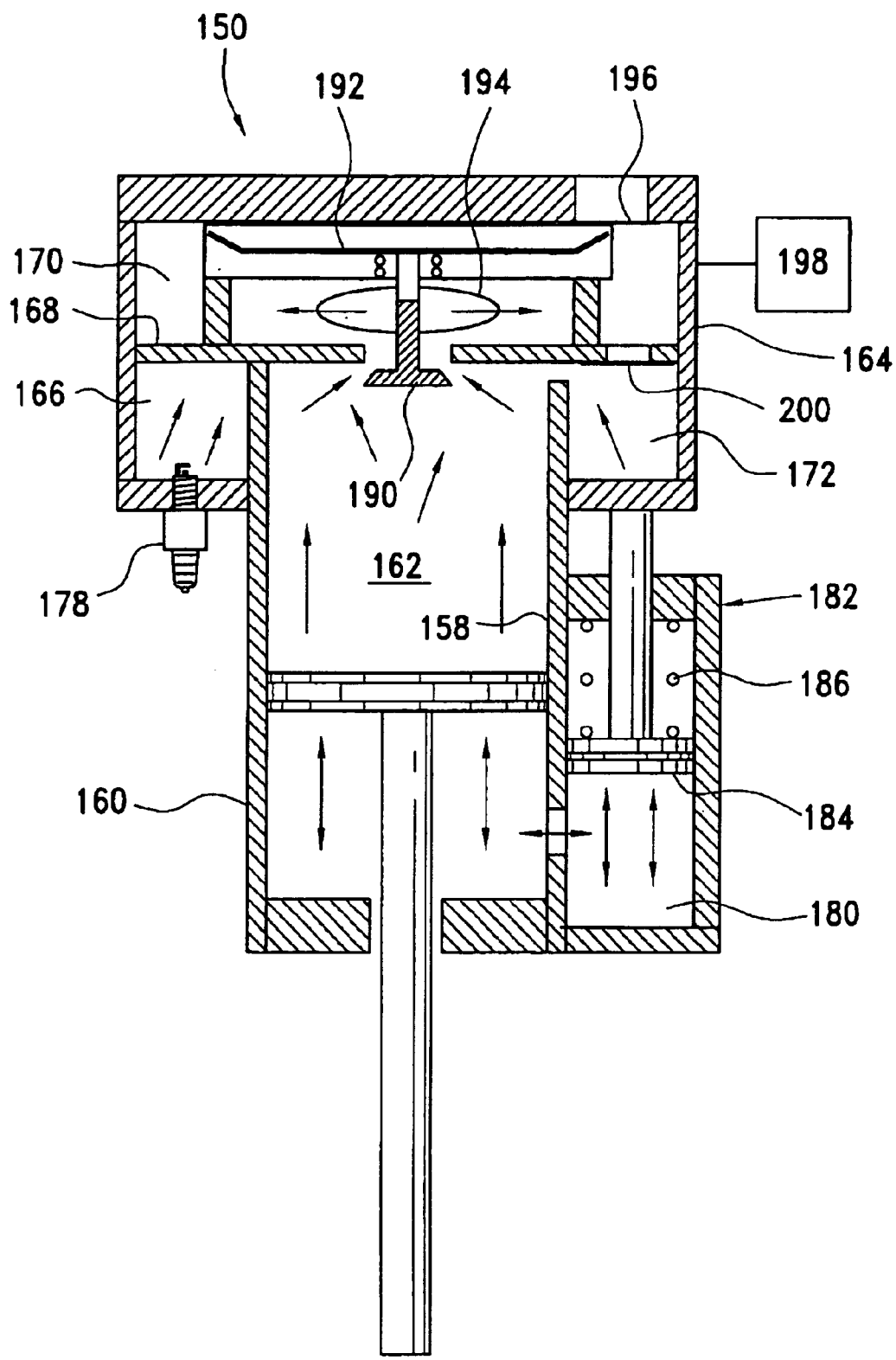

FIG. 8 is a similar schematic cross-sectional view of the fuel/air management system of FIG. 7 showing the displacer relatively moveable in response to pressure beneath the power piston following combustion for increasing the space of the pre-mixing chamber and decreasing the space of the combustion chamber.

Figure 9:
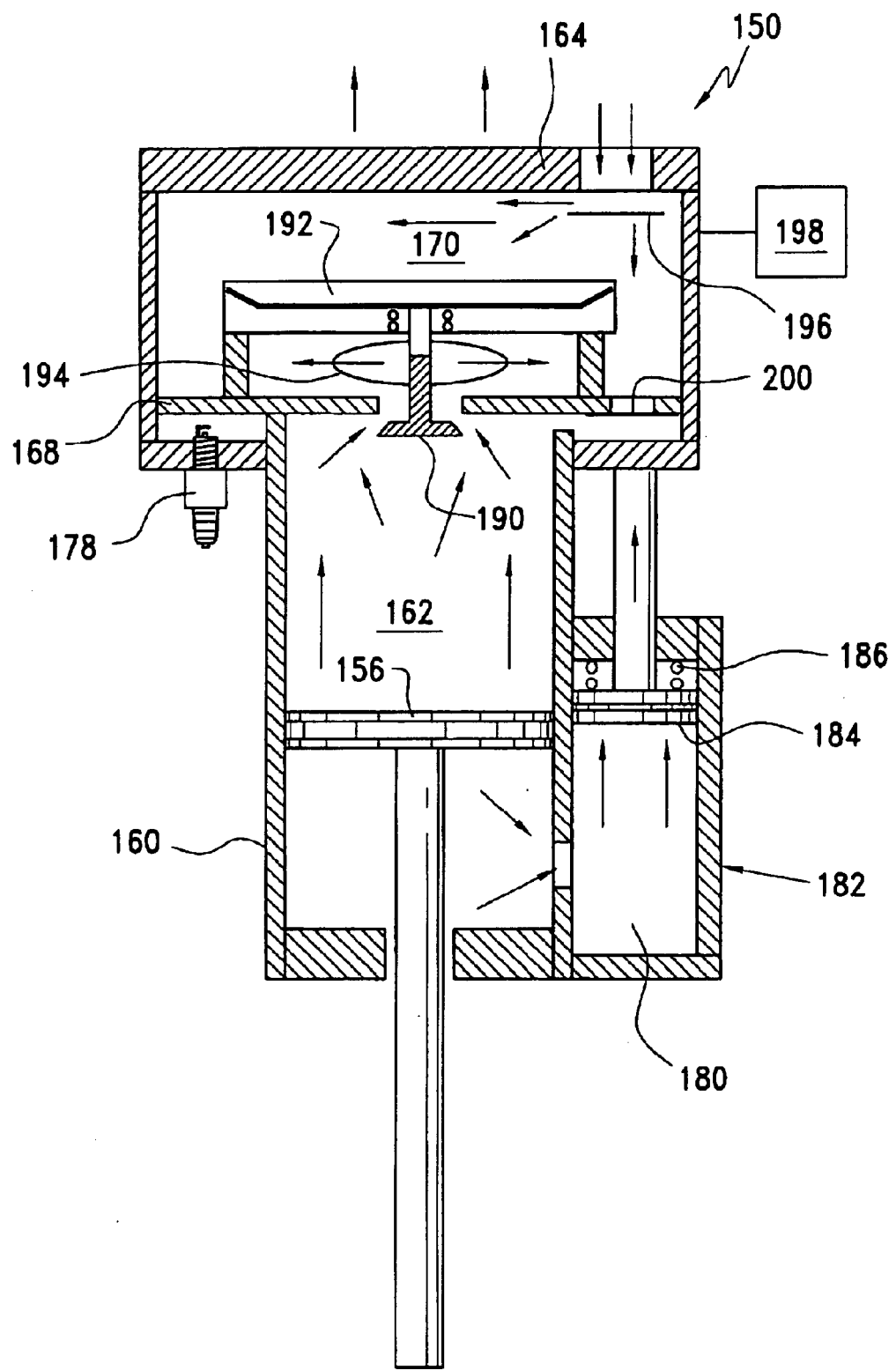

FIG. 9 is a similar schematic cross-sectional view of the fuel/air management system of FIG. 7 showing the pre-combustion and main combustion chambers collapsed for supporting the mechanical displacement of exhaust gases from the combustion chamber in association with the return of the power piston.

Figure 10:
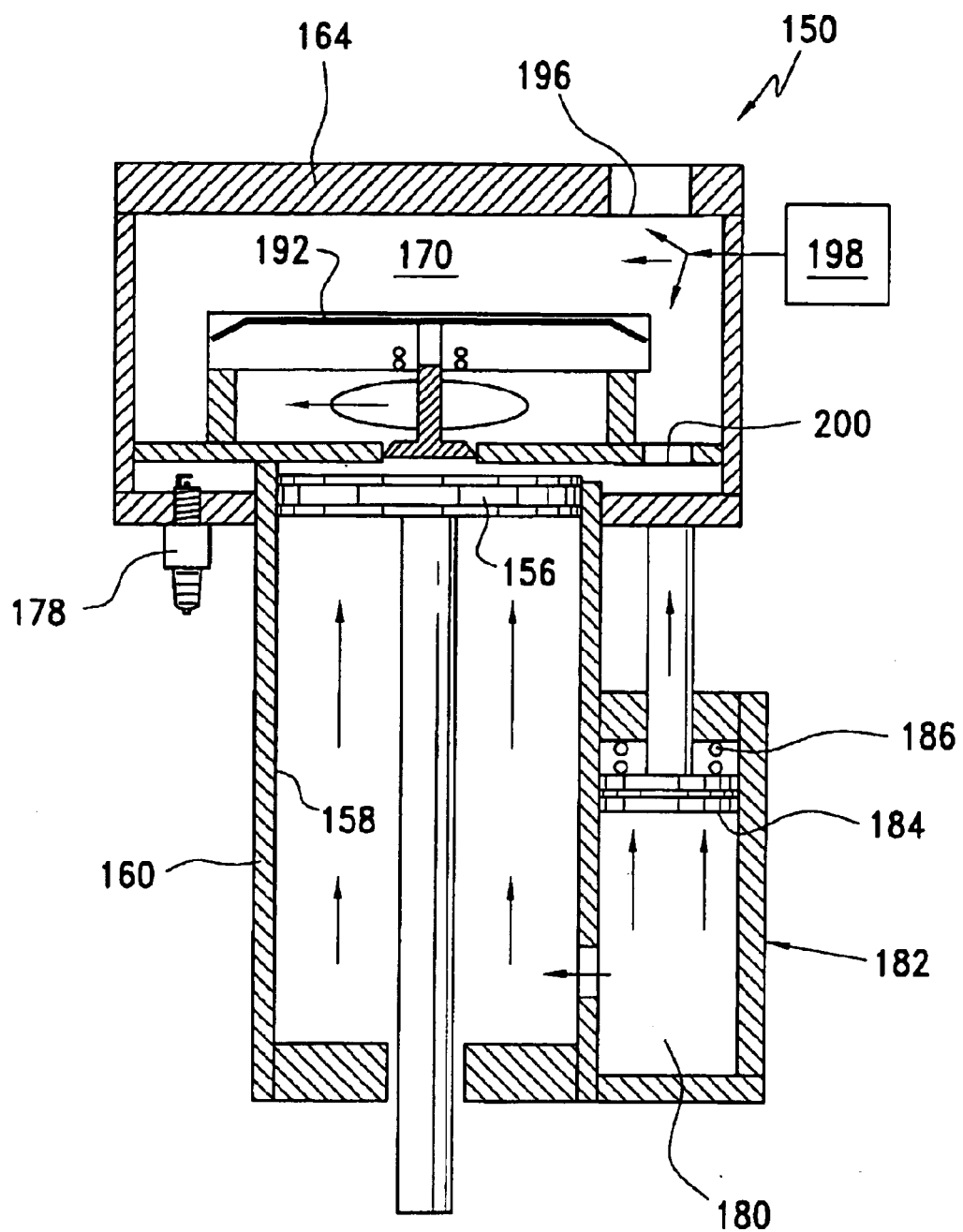

FIG. 10 is a similar schematic cross-sectional view of the fuel/air management system of FIG. 7 showing the start of a recharging cycle where the displacer is relatively moved in a direction for decreasing the space of the pre-mixing chamber and increasing the space of the combustion chamber.

Figure 11:
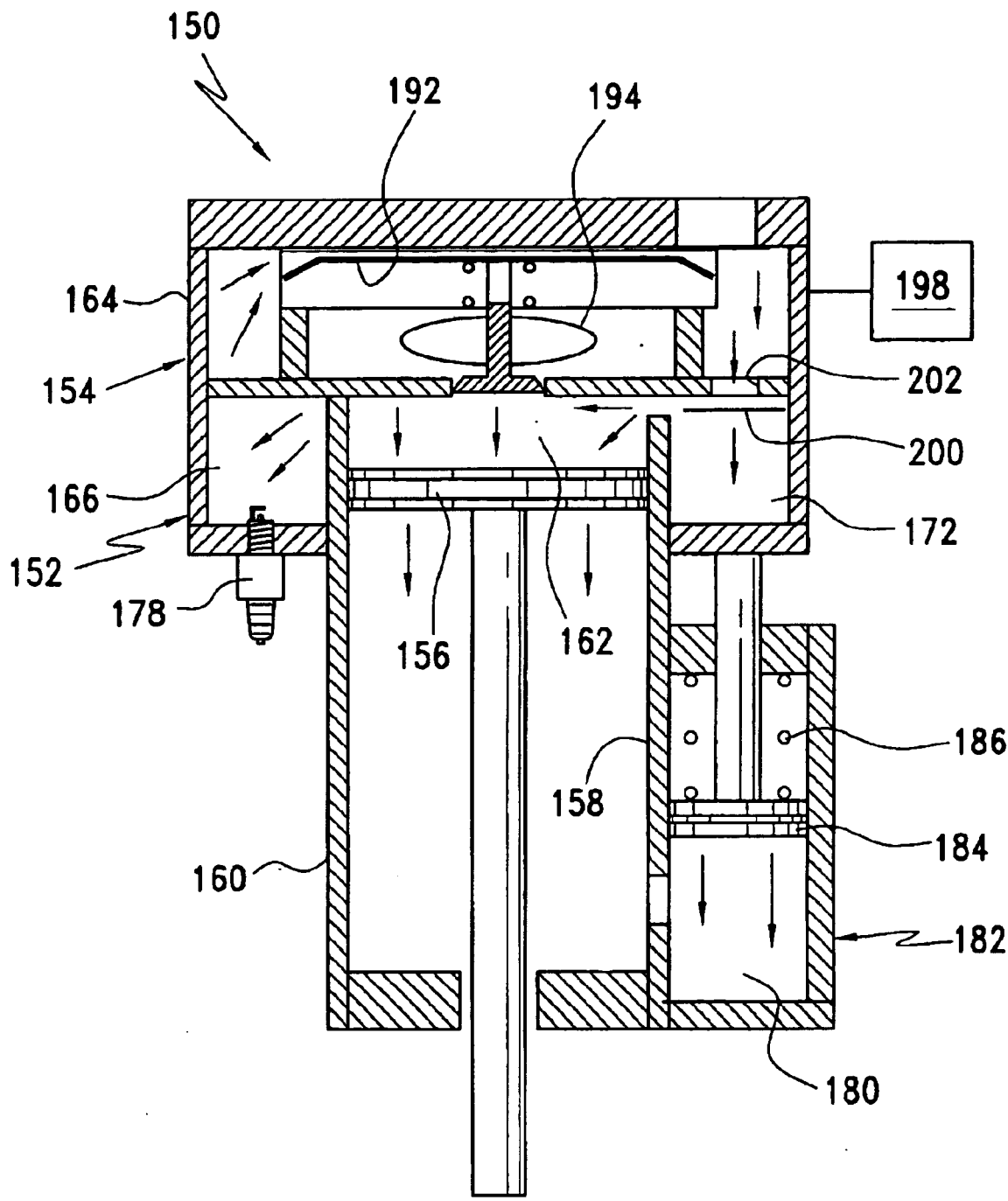

FIG. 11 is a similar schematic cross-sectional view of the fuel/air management system of FIG. 7 showing the transfer of a fresh charge from the pre-mixing chamber into the combustion chamber.

Figure 12:
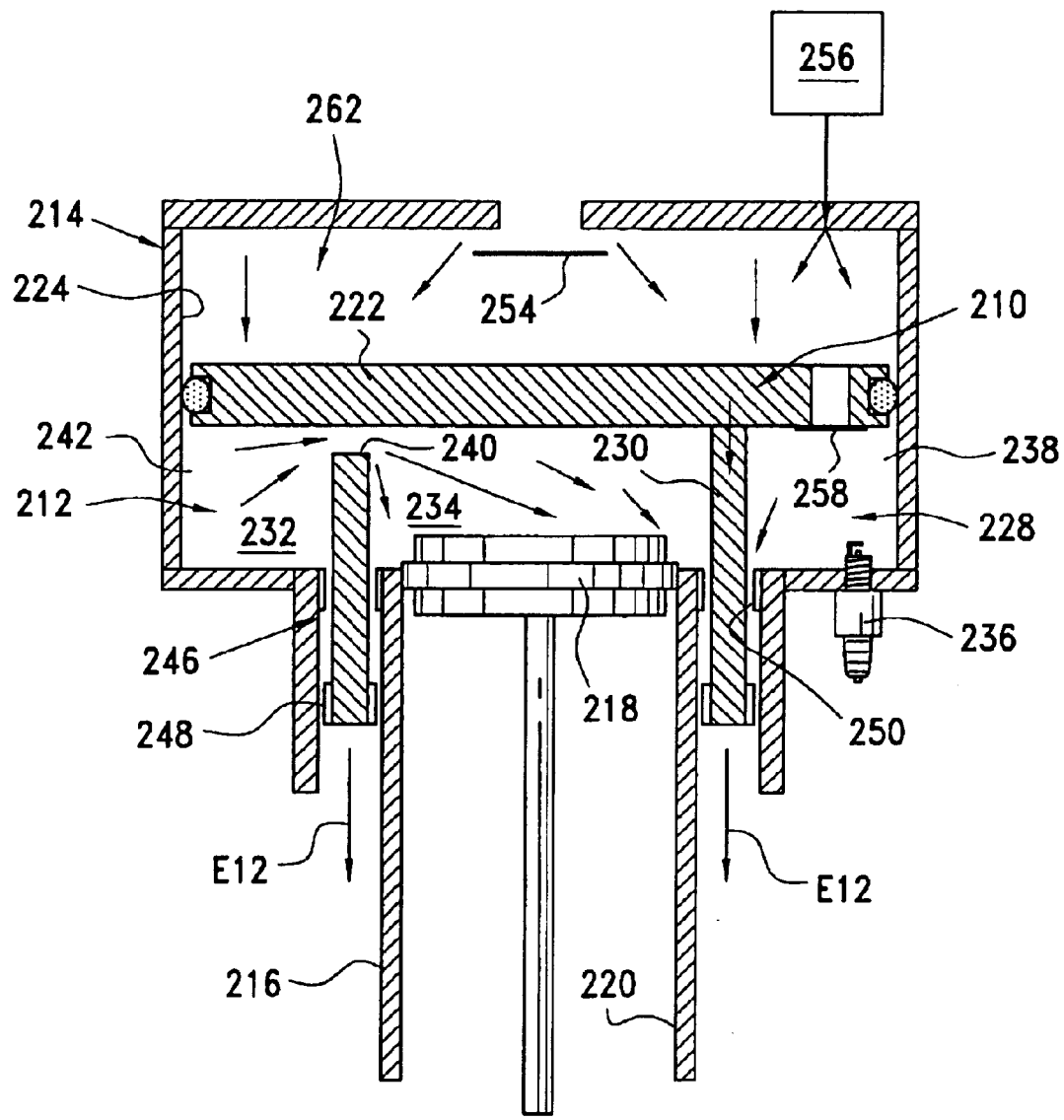

FIG. 12 is a schematic cross-sectional view of an alternative recharging system in which a displacer including a walled structure dividing a combustion chamber into a pre-combustion chamber and a main combustion chamber is moveable with respect to a fixed cylinder head and cylinder assembly shown displacing exhaust gas from the combustion chamber and drawing air and fuel into a pre-mixing chamber.

Figure 13:
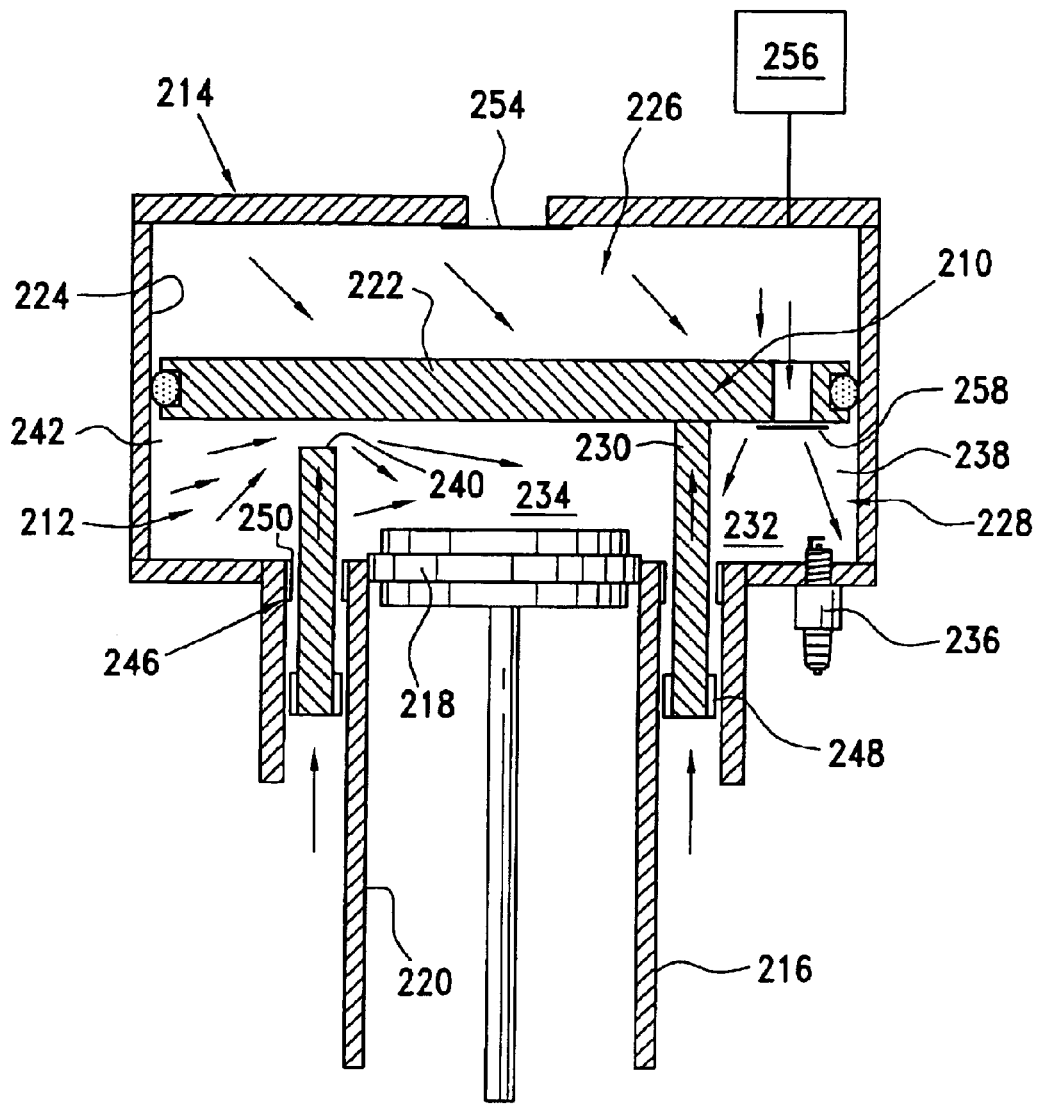

FIG. 13 is a similar schematic cross-sectional view of the recharging system of claim 12 showing the transfer of a fresh charge from the pre-mixing chamber into the combustion chamber.

Figure 14:
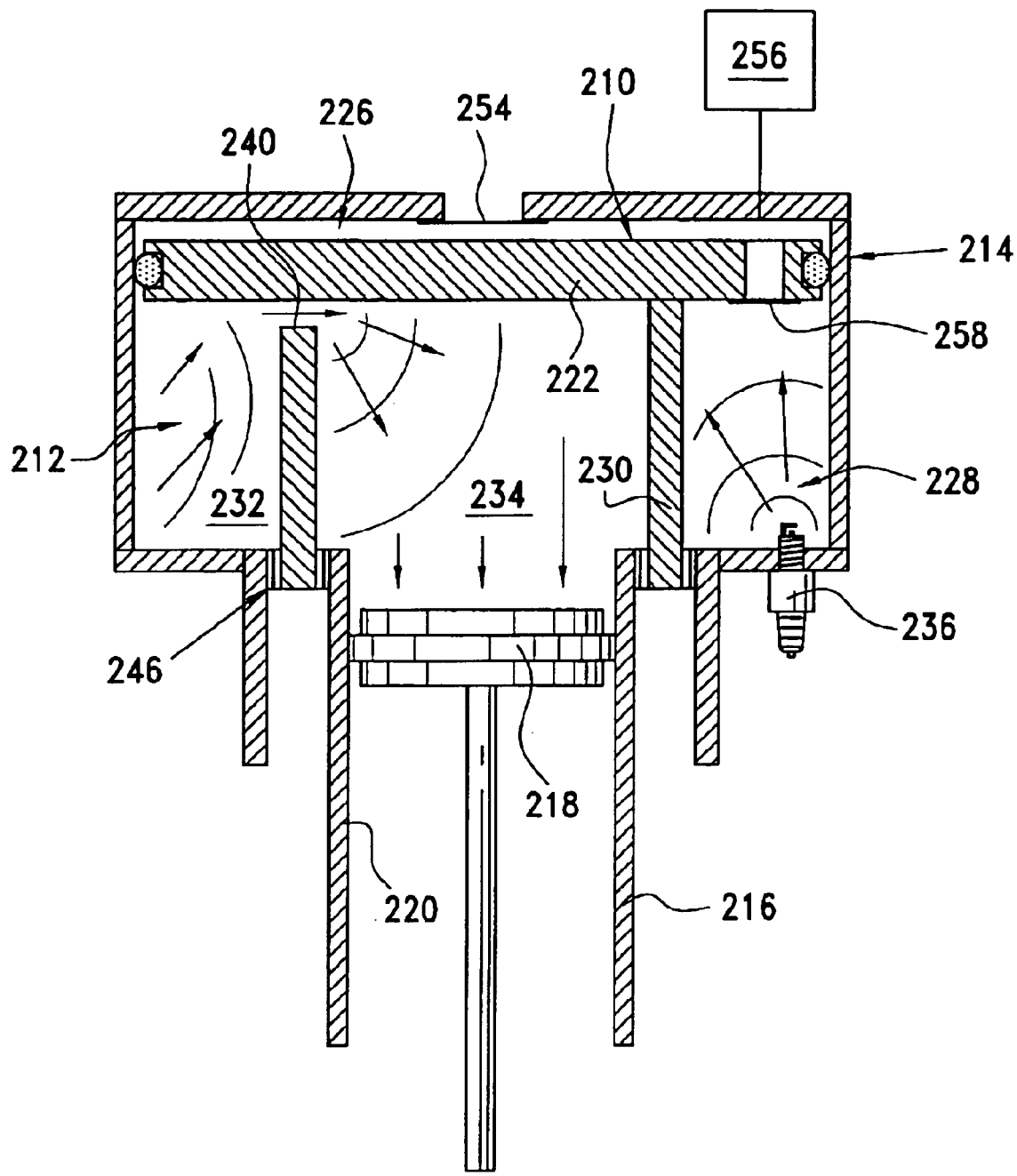

FIG. 14 is a similar schematic cross-sectional view of the recharging system of claim 12 showing a combustion stage initiated in the pre-combustion chamber and progressing into the main combustion chamber.

Figure 15:
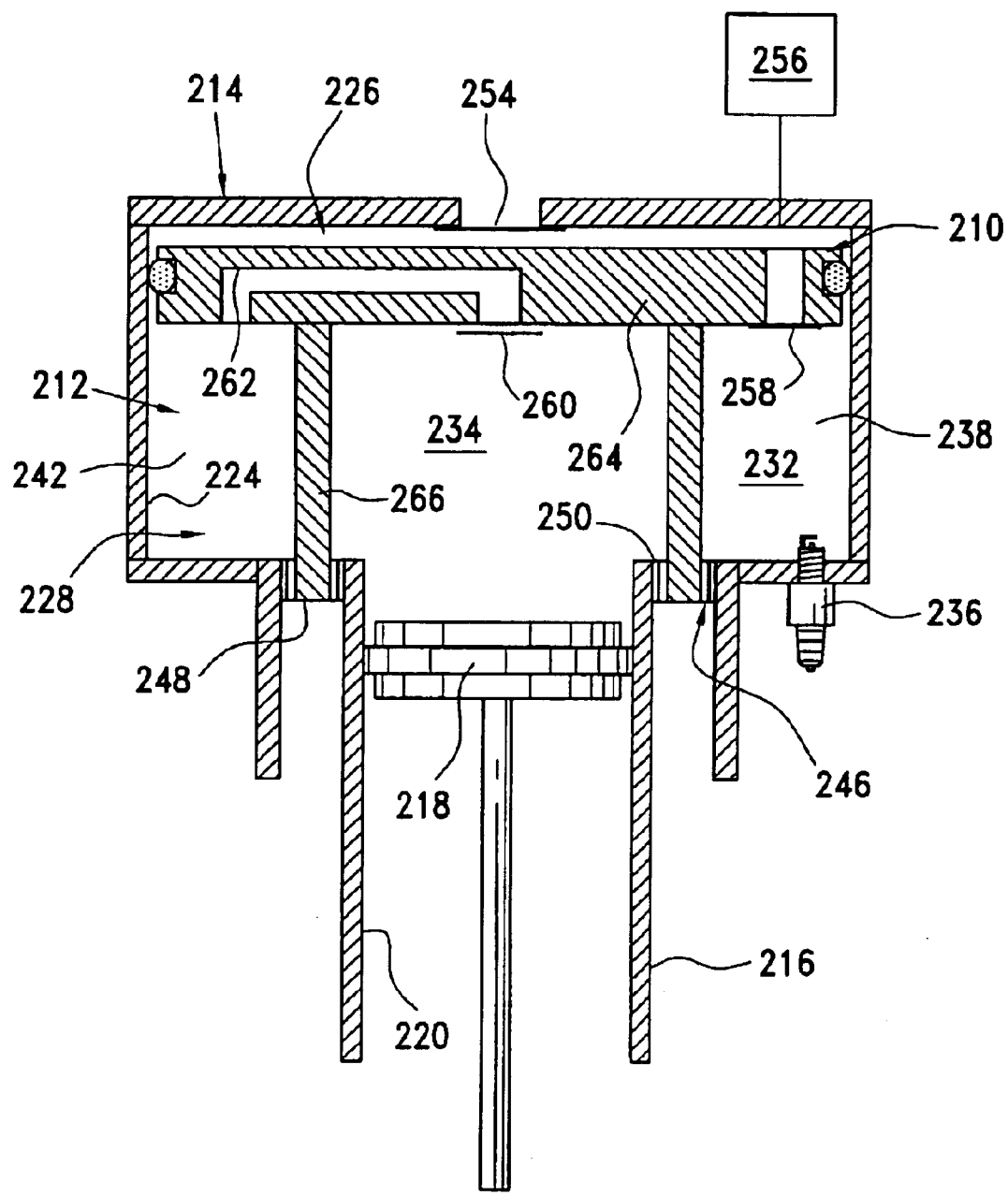

FIG. 15 is a schematic cross-sectional view of a recharging system similar to that of claim 12 but modified to regulate exchanges between the pre-combustion and main combustion chambers.

DETAILED DESCRIPTION OF THE INVENTION

Figure 1:
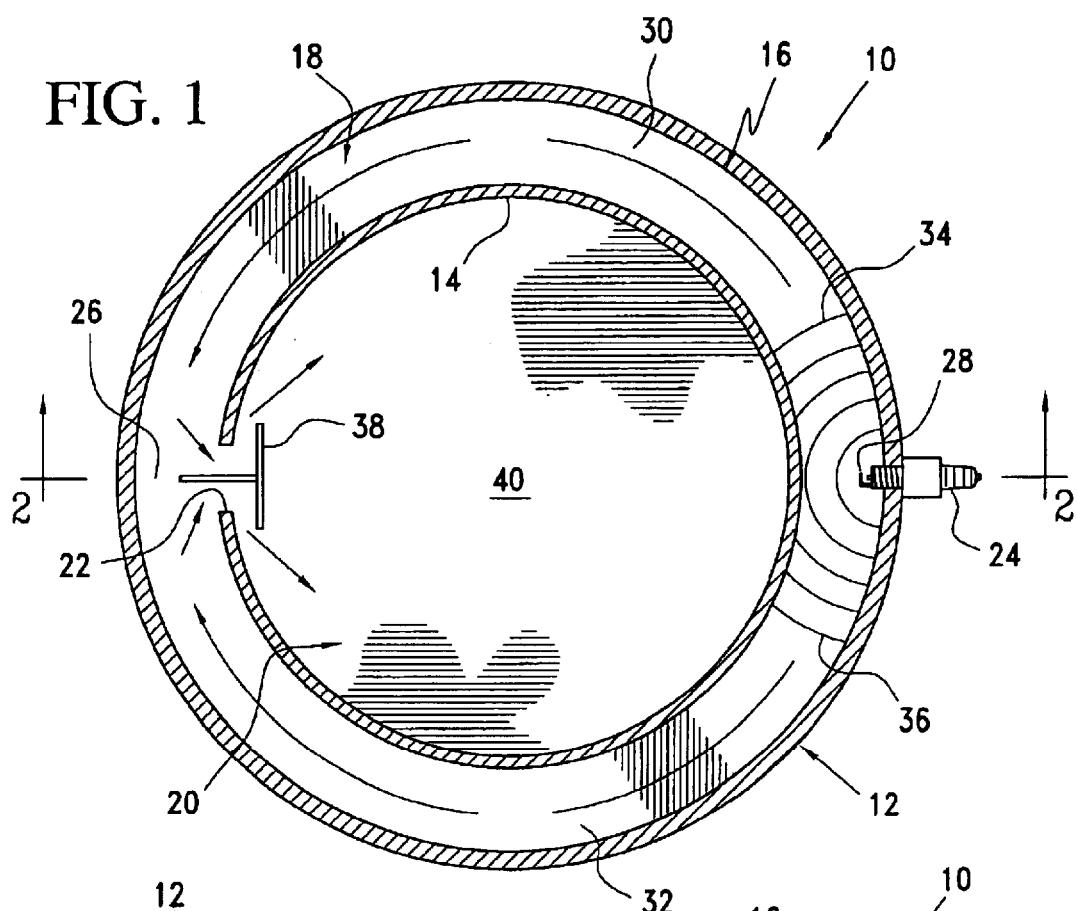
FIG. 1 is a schematic axial cross-sectional view of a multiple flame front (dual path) combustion chamber system in accordance with my invention taken along line 1—1 of FIG. 2.
Figure 2:
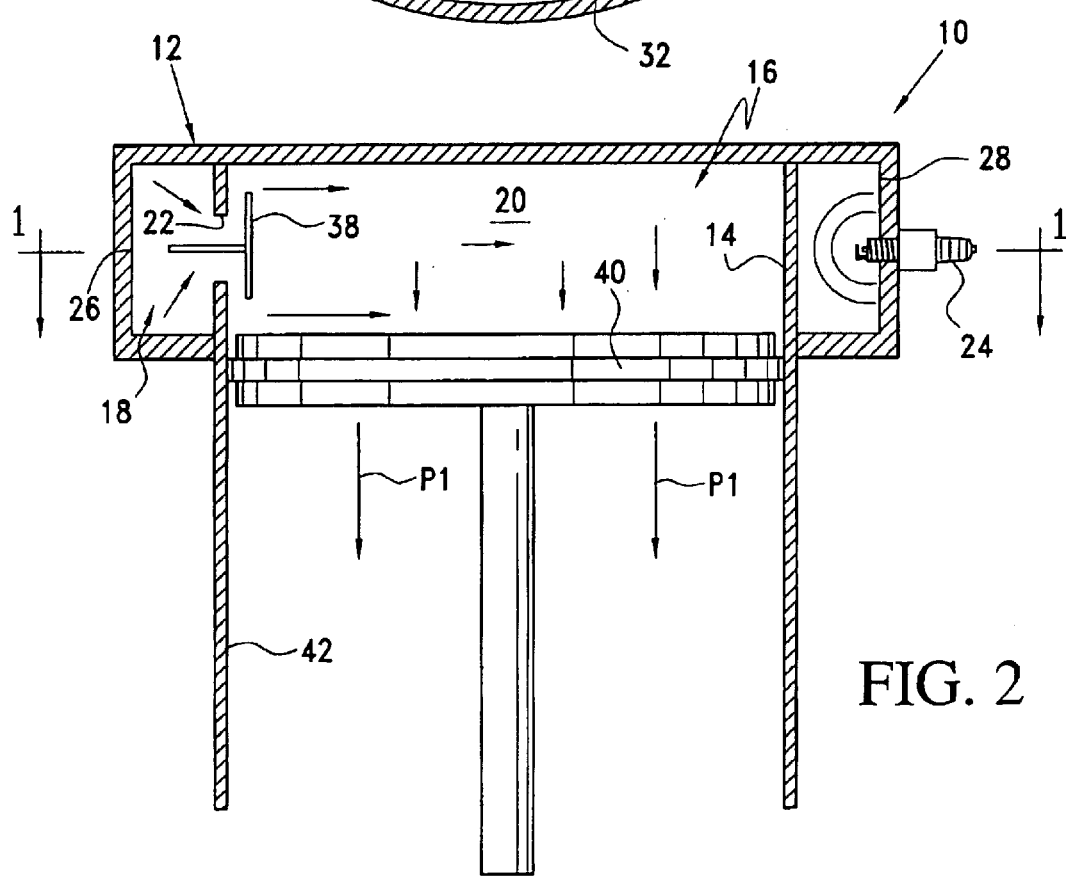
FIG. 2 is a similarly schematic side cross-sectional view of the dual path combustion chamber system showing a power piston moveable within a cylinder at one end of the combustion chamber.

A multiple-front combustion chamber system 10 is shown in FIGS. 1 and 2 within a modified cylinder head housing 12. An annular wall structure 14 within the cylinder head housing 12 divides a combustion chamber 16 into a pre-combustion chamber 18 and a main combustion chamber 20. The wall structure 14 forms a periphery of the main combustion chamber 20 and together with the cylinder head housing 12 defines an annular space of the pre-combustion chamber 18 surrounding the main combustion chamber 20. An opening 22 formed in the wall structure 14 between the pre-combustion chamber 18 and the main combustion chamber 20 defines a proximal end 26 of the pre-combustion chamber 18. A spark-ignition device 24 extending through the cylinder head housing 12 into the pre-combustion chamber 18 is positioned diametrically opposite to the opening 22 defining the distal end 28 of the pre-combustion chamber 18.

As best seen in FIG. 1, the annular structure of the pre-combustion chamber 18 provides two different passageways 30 and 32 between the distal end 28 at which the ignition source 24 is located and the proximal end 26 at which the opening 22 is located. Ignition of a charge of fuel and air by the spark-ignition device produces a matching pair of flame-fronts 34 and 36 that propagate in opposite directions around the main combustion chamber 20 toward the opening 22 at the common proximal end 26 of the pre-combustion chamber 18. The flame-front 34 is shown propagating in a counterclockwise direction along the passageway 30 pushing unburned charge in advance. The flame-front 36 propagates in a clockwise direction along the passageway 32 also pushing a charge of fuel and air in advance. As the flame-fronts 34 and 36 approach the proximal end 26 of the pre-combustion chamber 18 from opposite directions, the unburned charges propelled in their advance are forced through the opening 22 into the main combustion chamber 20 for creating turbulence and increased pressure within the main combustion chamber 20.

Both passageways 30 and 32 preferably have similar lengths and similar transverse dimensions limited to maintain an integrity of the flame-fronts 34 and 36 propagating along their common lengths. Preferably, the two flame-fronts 34 and 36 arrive together at the opening 22 into the main combustion chamber 20 to propel as much unburned fuel and air as possible into the main combustion chamber before igniting the charge within the main combustion chamber 20. A check valve 38 across the opening 22 limits the direction of fluid transfers to those from the pre-combustion chamber 18 to the main combustion chamber 20. Higher pressure generated by combustion within the main combustion chamber 20 and closes the check valve 38 and limits the space of further combustion to the main combustion chamber 20, where the unspent charge is concentrated as a result of the pre-combustion within the pre-combustion chamber 18. Combustion within the combustion chamber 20 drives a power piston 40 in the direction of arrows P1 along a cylinder bore 42 having a diameter similar to that of the main combustion chamber 20.

Although the volume of the pre-combustion chamber 18 is substantially equal to its transverse dimension multiplied by the length of its entire circumference, the individual path lengths traveled by the two flame-fronts 34 and 36 are limited to only one-half of the length of the pre-combustion chamber's circumference. Thus, the multiple flame-front combustion chamber system 10 provides for optimizing a total volume of the pre-combustion chamber 18 while limiting the lengths of travel of the flame fronts 34 and 36 between opposite ends of the pre-combustion chamber 18. The influx of a large volume of fuel and air from the pre-combustion chamber 18 combined with the shortened lengths of travel for the flame-fronts 34 and 36 provides for reducing the time from ignition to peak combustion pressure while producing nearly the same peak pressure as a similar volume pre-combustion chamber having a single passageway of twice the length. In fact, the ignition-to-peak-pressure time is believed to be nearly cut in half. Both passageways 30 and 32 are curved for increasing flame front speed.

Figure 3:
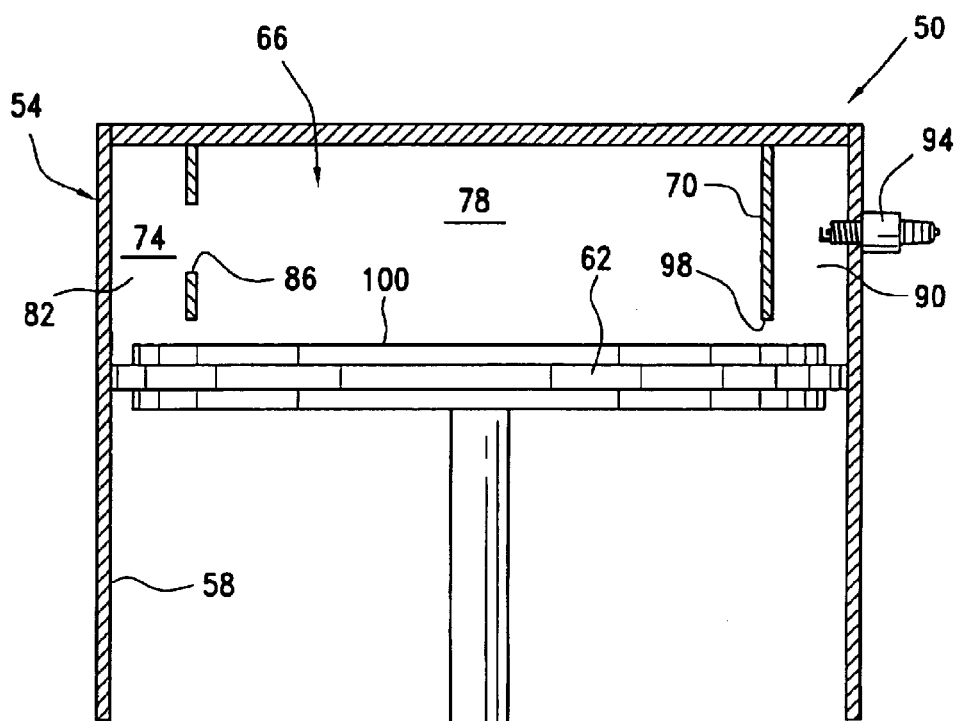
FIG. 3 is another schematic cross-sectional side view showing the power piston slightly displaced with respect to a barrier that divides the combustion chamber into a pre-combustion chamber and a main combustion chamber.
Figure 4:
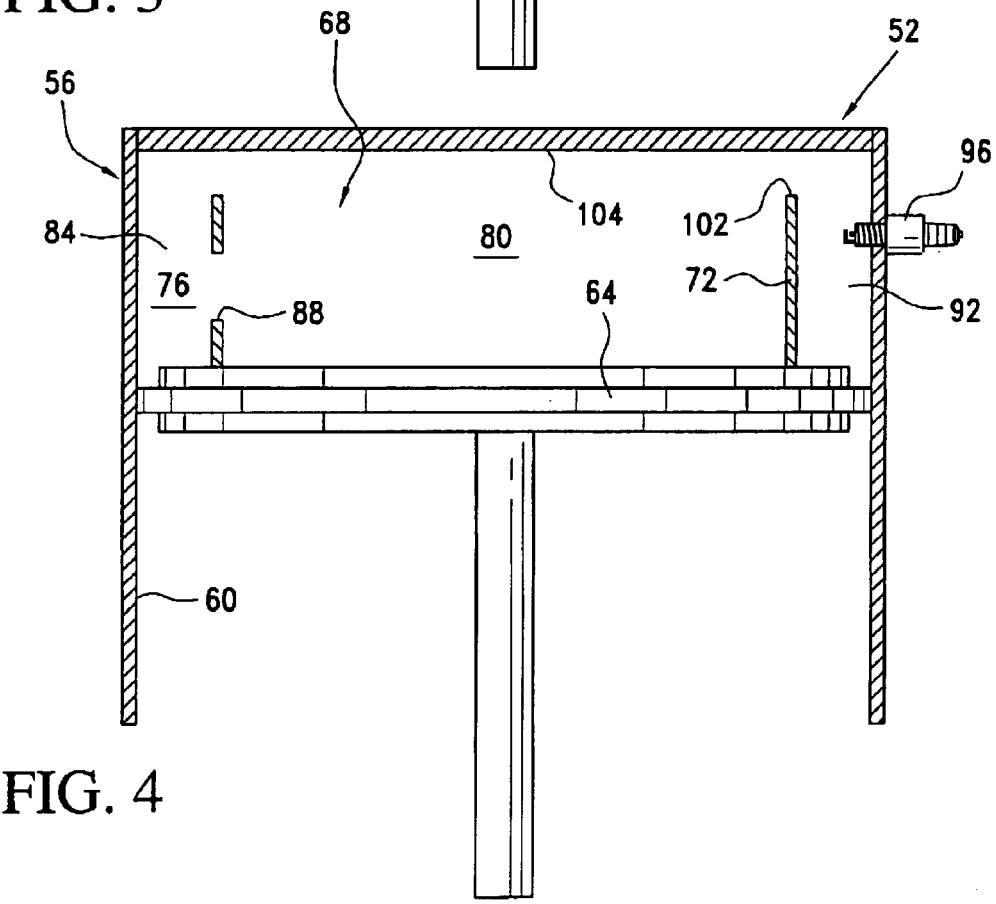
FIG. 4 is a similar schematic cross-sectional view showing an alternative arrangement of the barrier as being moveable together with the power piston.

Alternative multiple-front combustion chamber systems 50 and 52 shown in FIGS. 3 and 4 include similar cylinder head housings 54 and 56 that are sized in diameter matching the diameters of cylinder bores 58 and 60 for guiding power pistons 62 and 64 along their axial lengths. Combustion chambers 66 and 68 located above the power pistons 62 and 64 are divided by wall structures 70 and 72 into pre-combustion chambers 74 and 76 and main combustion chambers 78 and 80. Similar to the preceding embodiment of FIGS. 1 and 2, the main combustion chambers 78 and 80 are surrounded by annular pre-combustion chambers 74 and 76 that are formed between the wall structures 70 and 72 and the cylinder head housings 54 and 56. Both pre-combustion chambers 74 and 76 have proximal ends 82 and 84 located at openings 86 and 88 formed through the wall structures 70 and 72 between the pre-combustion chambers 74 and 76 and the main combustion chambers 78, and 80. The two pre-combustion chambers 74 and 76 also have distal ends 90 and 92 at which spark-ignition devices 94 and 96 are located. The annular pre-combustion chambers 74 and 86 each provide curved passageways in opposite directions around the main combustion chambers 78 and 80 between their distal ends 90 and 92 and their proximal ends 82 and 84.

However, in contrast to the proceeding embodiment of FIGS. 1 and 2, the multiple flame-front combustion chamber systems 50 and 52 of FIGS. 3 and 4 disperse combustion throughout the total volumes of the combustion chambers 66 and 68 for driving the power pistons 62 and 64. Since both the pre-combustion chambers 74 and 76 and the main combustion chambers 78 and 80 participate in generating a combustion pressure against the power pistons 62 and 64, no check valve regulation is required across the openings 86 and 88 for exploiting differential pressures and charge contents between the pre-combustion chambers 74 and 76 and the main combustion chambers 78 and 80. The combustion chamber systems 50 and 52 of FIGS. 3 and 4 are best suited for applications where shortened ignition-to-peak-pressure times are required but a lower range of peak pressures can be accommodated.

The two embodiments of FIGS. 3 and 4 differ from each other in their support for the wall structures 70 and 72. In the multiple flame-front combustion chamber system 50 of the FIG. 3, the wall structure 70 projects from the cylinder head housing 54. A top surface 100 of the power piston 62 contacts an exposed edge 98 of the wall structure 70 at the topmost position of its stroke. The power piston 62 preferably remains sealed to the edge 98 of the wall structure 70 for isolating the pre-combustion chamber 74 from the main combustion chamber 78 until combustion is well underway.

In the multiple-front combustion chamber system 52 of FIG. 4, the wall structure 72 projects from the power piston 64. An annular edge 102 of the wall structure 72 contacts an inner end face 104 of the cylinder head housing 56 at the topmost position of the power piston 64. The annular edge 102 and the end face 104 of the cylinder head housing 56 maintain a seal to isolate the pre-combustion chamber 76 from the main combustion chamber 80 until combustion is well underway. Movement of the power pistons 62 and 64 from their topmost positions permits largely unrestricted communication between the pre-combustion chambers 74 and 76 and the main combustion chambers 78 and 80 for the remainder of their strokes.

Figure 5:
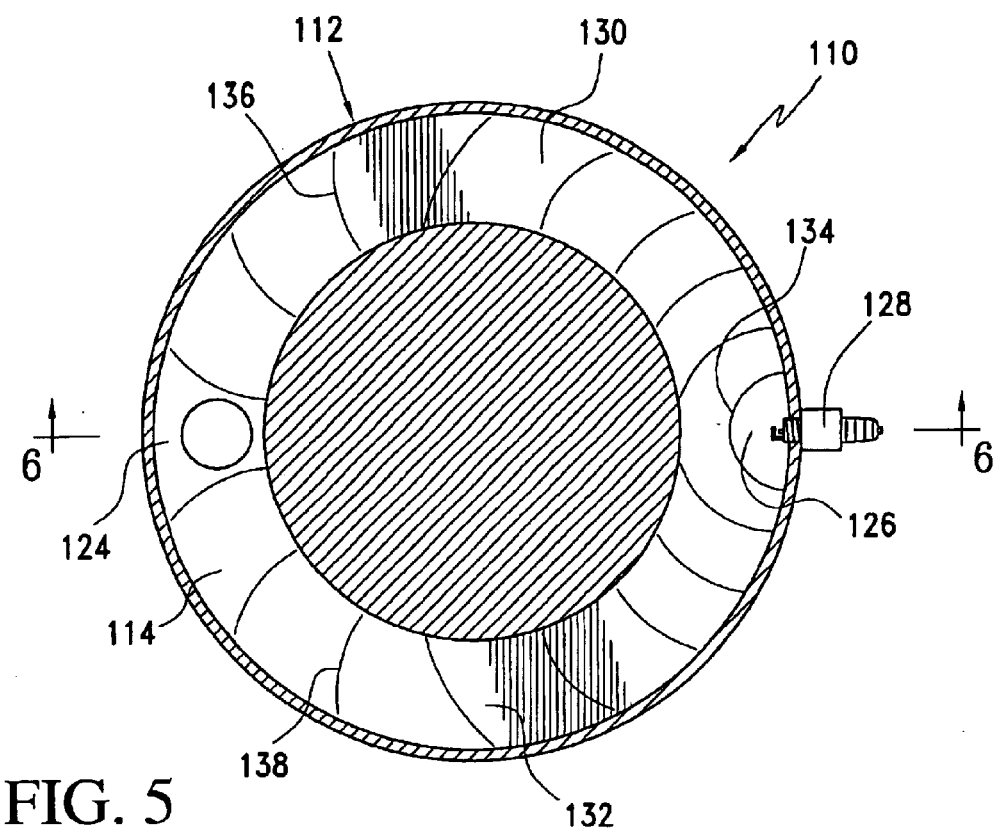
FIG. 5 is a schematic cross-sectional top view of a multiple flame-front combustion chamber assembly having a stacked configuration of pre-combustion and main combustion chambers shown along line 5—5 of FIG. 6.
Figure 6:
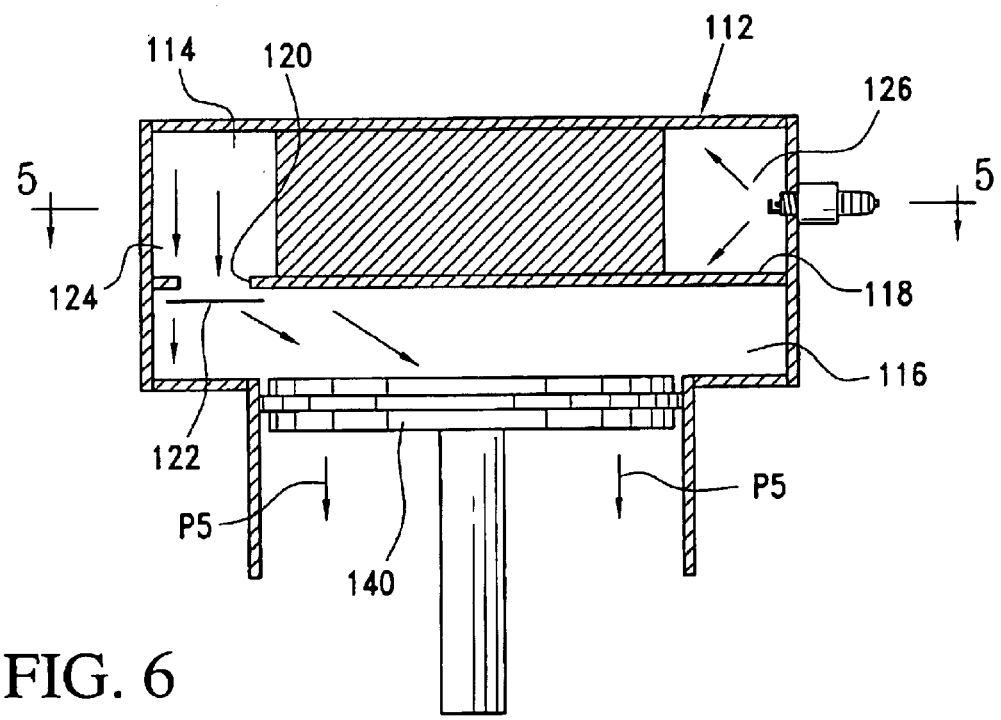
FIG. 6 is a schematic cross-sectional side view of the stacked combustion chamber assembly of FIG. 5 taken along line 6—6 of FIG. 5.

A multiple-front combustion chamber system 110 illustrated in FIGS. 5 and 6 includes a two-stage combustion chamber 112 that is divided axially into an annular pre-combustion chamber 114 and a cylindrical main combustion chamber 116. A planar wall 118 separates the annular pre-combustion chamber 114 from the main combustion chamber 116 with the pre-combustion and the main combustion chambers 114 and 116 arranged in a stack. An opening 120, regulated by a check valve 122 permits unidirectional transfers from the pre-combustion chamber 114 into the main combustion chamber 116.

Similar to the preceding embodiments, the pre-combustion chamber 114 includes a proximal end 124 at the opening 120 into the main combustion chamber 116 and a distal end 126 located at a spark-ignition source 128. Arcuate pathways 130 and 132 connect the proximal and distal ends 124 and 126 for conveying a flame-front 134 as two separate flame-fronts 136 and 138 propagating in opposite directions around the annular pre-combustion chamber 114 following the separate pathways 130 and 132. The two flame-fronts 136 and 138 push unburned charges of fuel and air ahead of them through the opening 120 into the main combustion chamber 116. Preferably, the length and transverse dimensions of the passageways 130 and 132 match or exhibit appropriate ratios with respect to each other so that the two flame-fronts 136 and 138 arrive substantially together at the opening 120 to optimize the delivery of unburned charge into the main combustion chamber 116. The symmetrical arcuate shapes of the passageways 130 and 132 also contribute to the simultaneity of the two flame-fronts' (136 and 138) arrival. The curved passageways 130 and 132 are also expected to contribute to the propagating speed of the two flame-fronts 136 and 138. The driving of a power piston 140 in the direction of arrows P5 results from the ensuing combustion in the main combustion chamber 116. The check valve 122 limits the combustion volume to the main combustion chamber 116, which has been turbulated and pressurized by the entry of unburned charge from the pre-combustion chamber and optimally ignited by the subsequent arrival of the flame-fronts 136 and 138 generated within the pre-combustion chamber 114.

FIGS. 7–11 depict the cycle of a linear motor 150 in which a multiple-front combustion chamber system 152 cooperates with a fuel-air management system 154 for further optimizing the operation of a spark-ignited positive-displacement internal combustion engine such as the illustrated linear engine 150. A power piston 156 is guided along a bore 158 of a piston cylinder 160. Above the power piston 156, a main combustion chamber is defined within the cylinder bore 158. A cylinder head housing 164 is slidably mounted on the piston cylinder 160. An annular pre-combustion chamber 166 surrounding the main combustion chamber 162 is formed between the piston cylinder 160 and the cylinder head housing 164. A displacer plate 168 closes an open end of the piston cylinder 160 and separates the pre-combustion chamber 166 from a pre-mixing chamber 170, which is also formed within the cylinder head housing 164.

Similar to the preceding embodiments, the pre-combustion chamber 166 includes proximal and distal ends 172 and 174. The proximal end 172 is located at an opening 176 formed through the piston cylinder for connecting the pre-combustion chamber 166 with the main combustion chamber 162. The distal end 174 is located adjacent to a spark-ignition device 178 in a position that is diametrically opposite to the opening 176. Accordingly, flame-fronts originating at the spark-ignition device 178 at the distal end 174 propagate in opposite directions around the annular pre-combustion chamber 166 meeting at the opening 176 at the proximal end of the pre-combustion chamber 166. FIG. 7 shows the effects of a combustion originating in the pre-combustion chamber 166 and progressing through the main combustion chamber 162 for driving the power piston 156 in the direction of arrows P7.

As shown in FIGS. 7–9, air compressed beneath the power piston 156 charges a plenum 180 of an actuator 182. Accumulating air pressure within the plenum 180 acts on an operating piston 184 of the actuator 182 for overcoming a bias of a spring 186 for sliding the cylinder head housing 164 along the piston cylinder 160 in a direction that collapses the pre-combustion and main combustion chambers 166 and 162 as shown in FIG. 9.

Accompanying the collapse of the pre-combustion and main combustion chambers 166 and 162, an exhaust valve 190 is opened for discharging exhaust gases from the combustion chamber 162. The exhaust valve 190 regulates an opening through the displacer plate 168 for discharging the exhaust gases. The exhaust valve 190 is shown operated by a diaphragm 192, which is exposed to a source of pressure that can be drawn from above or below the power piston 156. For example, a separate line not shown can be used to connect the diaphragm 192 to the space beneath the power piston 156 for actuating the exhaust valve 190 when the force acting on the diaphragm 192 exceeds the combustion pressure within the main combustion chamber 162. The orifice 194 represents an opening that extends through the cylinder head housing 164 for conveying the discharged exhaust gases from the motor 150.

The relative movement of the displacer plate 168 in the direction shown in FIG. 9, which is effected by movement of the cylinder head housing 164 along the piston cylinder 160, has the effect of decreasing the volume of the pre-combustion and main combustion chambers 166 and 162 while simultaneously increasing the volume of the pre-mixing chamber 170. The expanding volume of the pre-mixing chamber 170 draws open a check valve 196 for admitting air into the pre-mixing chamber 170. Air pressure within the plenum 180 also returns the power piston 156 to its uppermost position effectively collapsing the main combustion chamber 162 as well. The return of the power piston 156 can also be used to effect the closing of the exhaust valve 190, the exhaust gases already being physically displaced from both the pre-combustion chamber 166 and the main combustion chamber 162.

As shown in FIG. 10, with the cylinder head housing 164 in its extended-most position for collapsing the pre-combustion chamber 166 and main combustion chamber 162 and with the power piston 156 restored to its uppermost position for further collapsing the main combustion chamber 162, both chambers 162 and 166 positively displace the exhaust gases from the engine through the exhaust valve 190, allowing the exhaust valve 190 to be closed in readiness for recharging the chambers 162 and 166. At the collapsed position of the pre-combustion and main combustion chambers 166 and 162, corresponding to the maximum displacement of the cylinder head housing 164, the pre-mixing chamber 170 reaches its greatest volume. Also at this point, the air pressure within the combined volume of the plenum 180 and the space beneath the power piston 156 has reached a minimum, allowing the biasing spring 186 to reverse the motion of the cylinder head housing 164. Just prior to or accompanying the reversal of the cylinder head housing 164, a fuel injector 198 injects fuel into the pre-mixing chamber 170. The fuel is preferably a vapored fuel such as propane, propylene, or Mapp gas, but a variety of other pressurized fuels such as acetylene or hydrogen could also be used.

The reversal of the cylinder head housing 164 relatively moves the displacer plate 168 to redistribute the volume within the cylinder head housing 164. The relative movement of the displacer plate 168 in the second direction decreases the volume of the pre-mixing chamber 170 and increases the volume of the pre-combustion chamber 166. Differential pressure produced by the relative motion opens a check valve 200 over an opening 202 in the displacer plate 168 to transfer a charge of fuel and air from the pre-mixing chamber 170 into the pre-combustion chamber 166. The decrease in volume of the pre-mixing chamber 170 is significantly larger than the accompanying increase in volume of the pre-combustion chamber 166 so that a portion of the charge enters the collapsed main combustion chamber 162 through the opening 176 and correspondingly displaces the power piston 156 to accommodate the additional charge volume. The power piston 156 can be biased toward its uppermost position so that the additional charge volume is accommodated by an increase in the pressure of the charge within the combined volume of the main combustion and pre-combustion chambers 162 and 166. In addition to or as an alternative to increasing the pressure or volume of the main combustion chamber 162, the excess charge of fuel and air can be used to scavenge any remaining exhaust gases in the pre-combustion and main combustion chambers 166 and 162. For example, the exhaust valve 190 can be further controlled to delay its closing until just after the reversal of the cylinder head housing 164. Thus, the first portion of the charge transferred from the pre-mixing chamber 170 performs a final scavenging function before filling and/or pressurizing the pre-combustion and main combustion chambers 166 and 162.

FIG. 11 shows the cylinder head housing 164 at its retracted-most position under the primary influence of the biasing spring 186. Here, the pre-combustion and main combustion chambers 166 and 162 are filled to capacity and ready for firing as first shown in FIG. 7.

Another example of a fuel-air management system 210 combined with a two-stage dual-path combustion chamber system 212 is shown in FIGS. 12–14 at different operating cycle stages. Here, a cylinder head housing 214 and a piston cylinder 216 form a stationary body of the engine. A power piston 218 is moveable along a piston bore 220 of the piston cylinder. A displacer plate 222, which preferably takes the form of a mixing piston, is similarly moveable along a bore 224 of the cylinder head housing 214. Above the displacer plate 222 within the cylinder head housing 214 is a pre-mixing chamber 226. Below the displacer plate 222 within the cylinder head housing 214 is a combustion chamber 228.

Attached to and moveable together with the displacer plate 222 is a barrier wall structure 230 that divides the combustion chamber 228 into a pre-combustion chamber 232 and a main combustion chamber 234. The barrier wall structure 230 in cooperation with the cylinder head housing 214 give the pre-combustion chamber 232 an annular shape surrounding the main combustion chamber 234. A spark-ignition device 236 is located at a distal end 238 of the pre-combustion chamber 232, and an opening 240 through the barrier wall structure 230 is located at a proximal end 242 of the pre-combustion chamber 232. A series connection from the ignition source 236 through the pre-combustion and combustion chambers 232 and 234 in sequence supports a two-stage combustion operation in which a flame-front propels an unburned charge of fuel and air ahead of its advance for turbulating and/or pressurizing a charge of fuel and air in the main combustion chamber 234 just prior to the arrival of the flame-front at the main combustion chamber 234. Also similar to the preceding embodiments, dual passageways are provided for conveying the flame-front as two separate flame-fronts propagating along the different passageways from the distal to the proximal ends of the pre-combustion chamber 232. The dual passageways, which wrap in opposite directions around the main combustion chamber 234, shorten the length of travel required for the flame-front, while maintaining or increasing the desired volume of the charge of fuel and air pushed in its advance.

FIG. 12 depicts a portion of the operating cycle of the engine in which the displacer plate 222 is relatively moved in a direction that increases the volume of the pre-mixing chamber 226 and decreases the volume of the combustion chamber 228. The further relative movement of the displacer plate 222 in the direction of arrows E12 collapses both the pre-combustion chamber 232 and the main combustion chamber 234 for positively displacing exhaust gases from both chambers. An exhaust valve 246 includes an valve member 248 formed on an exposed rim of the barrier wall structure 230 which mates with a valve seat 250 formed in the cylinder head housing 214. The timing of the closure of the exhaust valve 246 can be adjusted by controlling the overlapping lengths of the valve member 248 and the valve seat 250. The exhaust valve 246 can be structured to support the discharge of exhaust from either or both of the pre-combustion and main combustion chambers 232 and 234. Relative movement of the displacer plate 222 in the direction that collapses the combustion chamber 228 redistributes the volume of the cylinder head housing 214 by expanding the volume of the pre-mixing chamber 226. Ambient air is drawn into the expanding volume of the pre-mixing chamber 226 through an intake check valve 254 and fuel is injected into this volume by a fuel injector 256.

FIG. 13 shows a portion of the engine cycle in which the motion of the displacer plate 222 has been reversed for transferring the charge of fuel and air from the pre-mixing chamber 226 to the combustion chamber 228. The volume reduction of the pre-mixing chamber 226 effected by the relative movement of the displacer plate 222 increases the pressure of the fuel/air charge closing the intake check valve 254 to atmosphere while opening a check valve 258 that regulates flow between the pre-mixing chamber 226 and the combustion chamber 228. The transfer of charge from the pre-mixing chamber 226 fills the expanding volume of the pre-combustion chamber 232 and the expanding volume of the main combustion chamber 234, which connects to the pre-combustion chamber 232 through the opening 240. The exhaust valve 246 can be allowed to remain open through a portion of this recharging process to perform a final scavenging function to assure a cleaner charge within the combustion chamber 228.

FIG. 14 shows the displacer plate 222 positioned for minimizing the volume of the pre-mixing chamber 226 while maximizing the volume of the combustion chamber 228. In this position, the exhaust valve 246 is clearly closed. Due to the barrier wall structure 230 occupying a portion of the volume of the combustion chamber 228, the amount that the volume of the pre-mixing chamber 226 is decreased by the relative movement of the displacer plate 226 exceeds the amount by which the volume of the combustion chamber 228 is increased accompanying the same movement of the displacer plate 222. This difference is significant and very useful. For example, the same movement of the displacer plate 222 that reduces the volume of the pre-combustion chamber by sixteen cubic inches may only increase the volume of the combustion chamber 228 by thirteen cubic inches. The excess charge occupying the three cubic inches of differential volume can be used for a variety of purposes. For example, the excess charge volume can be used to increase the pressure of the charge in the combustion chamber 228. The excess charge can also be used for purposes of scavenging by leaving the exhaust valve open through a portion of the charge transfer. The main combustion chamber 234 could also be expanded by displacing the power piston 218 to accommodate the additional charge. Finally, the excess charge can be used to accommodate losses or inefficiencies in the transfer of the charge to assure that the combustion chamber 228 is recharged to at least atmospheric pressure. At the upper most position of the displacer plate 222, the spark-ignition device 236 can be fired for initiating combustion in sequence through the pre-combustion and combustion chambers 232 and 234 for driving the power piston 218 as shown.

The addition of a check valve 260 is shown in FIG. 15 for regulating flows between the pre-combustion chamber 232 and the main combustion chamber 234. The unchanged features of the design are designated using the same reference numerals as those of FIGS. 12–14. An opening between the pre-combustion and main combustion chambers 232, 234 is formed as a channel 262 within a modified displacer plate 264. The channel 262 bypasses a barrier wall structure 266 that divides the combustion chamber 228 into the pre-combustion chamber 232 and the main combustion chamber 234. The check valve 260 permits the flow of charge from the pre-combustion chamber 232 into the main combustion chamber 234 during the recharging cycle but does not permit the expanding gases associated with combustion in the main combustion chamber 234 to re-enter the pre-combustion chamber 232. This restriction enables higher peak combustion pressures to be achieved in the main combustion chamber 234 by exploiting the higher concentration of charge delivered by flame front to the main combustion chamber 234.

Although an actuator is not shown in the embodiment of FIGS. 12–14 or the embodiment of FIG. 15 for effecting the automatic relative motion of the displacer plate 222 or 264, it may be understood that an actuator similar to the piston actuator of FIGS. 7–11 may used. However, instead if moving the cylinder head housing with respect to a displacer plate, a similar piston actuator could be used to move the displacer plate with respect to a fixed cylinder head housing by arranging a piston rod to contact the exposed rim of the barrier wall structure that is moveable with the displacer plate 222 or 264.

The power for relatively moving the displacer plate separating the pre-mixing and combustion chambers in the various embodiments is preferably derived from pressures generated by combustion. For example, the power can be derived directly from the combustion gases themselves or from air compressed from beneath the power piston. The power can be put to immediate use or can be stored in a plenum or spring for later use. For example, the relative movement of the displacer plate can be effected by a spring which can be reset (compressed or extended) either manually or as a result of pressures generated on either side of the power piston. Preferably, the relative movement of the displacer in the direction that transfers charge from the pre-mixing chamber to the combustion chamber is timed with the ignition of the transferred charge to exploit the turbulence created by the transfer.

The multiple pathways provided for simultaneously propagating more than one flame front, which significantly shorten the ignition-to-peak-pressure time, provide advantages for both linear and crank-shaft type engines. For example, the shorter burn time means that in a crank-shaft type engine, the ignition timing can be retarded so that not as much fuel is consumed before the top dead center position of a piston, which could otherwise work against the desired rotation direction of the engine. The shorter burn time also allows more of the fuel to be burned after the top dead center position for increasing output power and improving efficiency. In a linear engine, such as may be used for a fastening tool, the quicker burn time allows for faster operation and less of a lag between the operator pulling a trigger and the fastener being driven, which in some cases can be quite noticeable. More importantly, the shorter burn time does not allow as much piston movement during the early stages of combustion prior to the main explosion that drives a fastener. Early piston movement can reduce peak pressure and limit the power developed from the combustion. Some tools also require a prescribed pre-run velocity, such as before a nail contacts wood, to reduce initial resistance or "stiction." Delays between ignition and peak pressure can cause the piston to move prematurely compromising the velocity requirement.

Although the invention has been described with respect to a limited number of embodiments, all having some features in common, a number of other modifications, changes and additions can be made to the embodiments within the intended scope of this invention. For example, although only two passageways are shown in each of the embodiments for dividing a flame-front into two separate flame-fronts traveling along the two pathways, the pre-combustion chamber can be divided into three or more passageways for supporting similar propagation of additional flame-fronts. The preferred passageways have equal transverse and length dimensions, but variations can be made in either for timing the arrival of the flame-fronts for particular purposes.

In all of the illustrated embodiments, the multiple passageways meet at a common opening into the main combustion chamber. However, the combustion chamber system can be modified so that separate openings into the main combustion chamber are provided for each of the passageways. This would eliminate the three-way juncture between the two passageways and the opening to force more of the unburned charge propelled by the flame-fronts into the main combustion chamber. However, the separate entryway systems for the passageways require the construction of additional walls which can complicate the structure and make for more difficult sealing. The preferred embodiments exploit the use of a single barrier wall for separating not only the pre-combustion chamber from the main combustion chamber, but also for separating the passageways from each other within the pre-combustion chamber.

What is claimed is:

1. A multiple-front combustion chamber system for a positive-displacement, spark-ignited internal combustion engine comprising:
   a main combustion chamber;
   a pre-combustion chamber having proximal and distal ends, the proximal end being connected to the main combustion chamber and a spark-ignition device being located at the distal end; and
   the pre-combustion chamber including a plurality of passageways between its proximal and distal ends so that a flame front ignited by the ignition device at the distal end of the pre-combustion chamber propagates along the plurality of passageways as separate flame fronts toward the proximal end of the pre-combustion chamber.

2. The combustion chamber system of claim 1 in which each of the plurality of passageways has a length and a limited transverse dimension for propagating the separate flame fronts along their respective lengths.

3. The combustion chamber system of claim 2 further comprising a fuel injection system for creating charges of fuel and air within the passageways of the pre-combustion chamber, and in which the limited transverse dimensions provide for maintaining an integrity of the separate flame fronts so that the flame fronts push unburned portions of the charges into the main combustion chamber preceding an arrival of the separate flame fronts at the proximal end of the pre-combustion chamber.

4. The combustion chamber system of claim 2 in which the plurality of passageways include first and second passageways having substantially equal lengths measured between the distal and proximal ends of the pre-combustion chamber so that the separate flame fronts that propagate along their respective lengths arrive together at the main combustion chamber.

5. The combustion chamber system of claim 2 in which the plurality of passageways combine to increase a total volume of the pre-combustion chamber while limiting a length of travel between distal and proximal ends of the pre-combustion chamber.

6. The combustion chamber system of claim 2 in which the plurality of passageways are curved for increasing flame front speed.

7. The combustion chamber system of claim 2 in which the plurality of passageways include first and second passageways, and at least one wall separates the first and second passageways along corresponding portions of their respective lengths.

8. The combustion chamber of claim 7 in which the wall separates the pre-combustion chamber from the main combustion chamber.

9. The combustion chamber system of claim 8, in which the wall includes an opening for connecting the pre-combustion chamber to the main combustion chamber.

10. The combustion chamber of claim 9 further comprising a premixing chamber for mixing a charge of fuel and air, a displacer separating the premixing chamber from the pre-combustion chamber and the main combustion chamber, and the wall being relatively moveable together with the displacer for transferring the charge of fuel and air into the pre-combustion and main combustion chambers.

11. The combustion chamber system of claim 1 further comprising:
   a premixing chamber for mixing a charge of fuel and air, and
   a displacer that separates the premixing chamber from at least one of the pre-combustion chamber and the main combustion chamber.

12. The combustion chamber system of claim 11 further comprising a fuel injector for injecting fuel into the premixing chamber.

13. The combustion chamber system of claim 12 in which the displacer is relatively moveable in a first direction for drawing air into the premixing chamber and is relatively moveable in a second direction for transferring the charge of fuel and air into at least one of the pre-combustion chamber and the main combustion chamber.

14. The combustion chamber system of claim 13 in which the relative movement of the displacer in the first direction increases a volume of the premixing chamber and decreases a collective volume of the pre-combustion chamber and the main combustion chamber for forcing exhaust gases from the collective volume of the pre-combustion and main combustion chambers.

15. A combustion chamber system comprising:
   a multi-path pre-combustion chamber containing a plurality of passageways;
   a main combustion chamber connected to the plurality of passageways of the pre-combustion chamber;
   a spark-ignition source for initiating combustion in the pre-combustion chamber;
   the plurality of passageways being arranged for separately conveying combustion fronts to the main combustion chamber for spreading combustion to the main combustion chamber;
   the plurality of passageways including first and second passageways that convey the separate combustion fronts in different directions from the spark-ignition source; and
   the first and second passageways having a common start at the spark-ignition source and a common end at an opening into the main combustion chamber.

16. The combustion chamber system of claim 15 in which the first and second passageways also have a common length between the common start and the common end of the first and second passageways.

17. The combustion chamber system of claim 15 in which the plurality of passageways include first and second passageways having respective length and transverse dimensions that are sized so that the separate combustion fronts propagating along their respective lengths arrive together at the combustion chamber.

18. A positive-displacement spark-ignited internal combustion engine apparatus comprising:
   a combustion chamber having a wall that divides the combustion chamber into a pre-combustion chamber and a main combustion chamber;
   the main combustion chamber being arranged in communication with a positive-displacement power transmitting device;
   the pre-combustion chamber being located externally of the main combustion chamber;
   a spark-ignition source located in the pre-combustion chamber remote from the opening in the wall; and
   the pre-combustion chamber containing a plurality of passageways between the spark-ignition source and the opening in the wall for conveying a corresponding plurality of combustion fronts along different routes to the combustion chamber.

19. The apparatus of claim 18 in which the plurality of passageways meet at the opening in the wall connecting the pre-combustion chamber to the main combustion chamber.

20. The apparatus of claim 19 in which the plurality of passageways also meet at the spark-ignition source.

21. The apparatus of claim 20 in which the plurality of passageways take different routes between the spark-ignition source and the opening in the wall.

22. The apparatus of claim 18 in which the pre-combustion chamber surrounds the main combustion chamber and a first of the plurality of passageways extends from the spark-ignition source in one direction around the main combustion chamber and a second of the plurality of passageways extends from the spark-ignition source in a different direction around the main combustion chamber.

23. The apparatus of claim 22 in which the first and second passageways approach the opening in the wall from different directions.

24. A fuel/air management system for an internal combustion engine comprising:
   a pre-combustion chamber for initiating combustion;
   a main combustion chamber for furthering combustion to generate output power for the engine;
   a premixing chamber for mixing a charge of fuel and air;
   a displacer that separates the premixing chamber from at least one of the pre-combustion chamber and the main combustion chamber; and
   the displacer being relatively moveable for transferring the charge of fuel and air from the premixing chamber into at least one of the pre-combustion chamber and the main combustion chamber.

25. The fuel/air management system of claim 24 in which the displacer is relatively moveable in a first direction for drawing air into the premixing chamber and is relatively moveable in a second direction for transferring the charge of fuel and air into at least one of the pre-combustion chamber and the main combustion chamber.

26. The fuel/air management system of claim 25 in which the relative movement of the displacer in the first direction increases a volume of the premixing chamber and decreases a collective volume of the pre-combustion and main combustion chambers for forcing exhaust gases from the collective volume of the pre-combustion and main combustion chambers.

27. The fuel/air management system of claim 26 in which the relative movement of the displacer in the first direction opens an exhaust valve for discharging exhaust gases from the collective volume of the pre-combustion and main combustion chambers.

28. The fuel/air management system of claim 24 further comprising:
   an opening between the pre-combustion chamber and the main combustion chamber,
   a check valve that restricts flows from the main combustion chamber to the pre-combustion chamber, and
   exhaust passages that allow the discharge of exhaust gases from the pre-combustion chamber and the main combustion chamber independently of the opening between the pre-combustion chamber and the main combustion chamber.

29. The fuel/air management system of claim 28 in which the displacer is relatively moveable in a first direction for forcing exhaust gases through the exhaust passages from both the pre-combustion chamber and the main combustion chamber.

30. The fuel/air management system of claim 24 further comprising:
   an opening between the pre-combustion chamber and the main combustion chamber,
   a spark-igniter connected to the pre-combustion chamber remote from the opening, and
   a fuel injector connected to the premixing chamber.

31. The fuel/air management system of claim 30 in which the pre-combustion chamber includes a plurality of passageways extending between the spark-igniter and the opening.

32. The fuel/air management system of claim 24 in which a wall relatively moveable together with the displacer separates the pre-combustion chamber from the main combustion chamber.

33. The fuel/air management system of claim 32 in which the relative movement of the wall together with the displacer in the first direction increases a volume of the mixing chamber and decreases a collective volume of the pre-combustion chamber and the main combustion chamber.

34. The fuel/air management system of claim 33 further comprising an exhaust valve that is opened and closed according to the relative movement of the wall for discharging exhaust gases from the collective volume of the pre-combustion and main combustion chamber.

35. The fuel/air management system of claim 32 in which the relative movement of the wall together with the displacer in the second direction decreases a volume of the mixing chamber and increases a collective volume of the pre-combustion chamber and the main combustion chamber.

36. The fuel/air management system of claim 35 in which the increase in the collective volume of the pre-combustion and main combustion chambers as a result of the relative movement of the displacer in the second direction is reduced with respect to the decrease in volume of the mixing chamber as a result of the same relative movement of the displacer in the second direction by the volume occupied by the wall within the collective volume of the pre-combustion and main combustion chambers.

37. The fuel/air management system of claim 34 in which the wall surrounds the main combustion chamber.

38. A recharging system for an internal displacement engine comprising:
   a mixing chamber for mixing a charge of fuel and air;
   a combustion chamber for combusting the charge of fuel and air;

a displacer separating the mixing chamber from the combustion chamber;

the displacer being relatively moveable in a first direction for increasing a volume of the mixing chamber and decreasing a volume of the combustion chamber;

the displacer being relatively moveable in a second direction for decreasing the volume of the mixing chamber and increasing the volume of the combustion chamber;

the relative movement of the displacer in the second direction providing for transferring the charge of fuel and air from the mixing chamber into the combustion chamber; and the decrease in volume of the mixing chamber exceeding the increase in volume of the combustion chamber as a result of the relative movement of the displacer in the second direction.

39. The recharging system of claim 38 in which the combustion chamber is divided by a barrier into a pre-combustion chamber and a main combustion chamber with the barrier occupying a portion of the volume of the combustion chamber.

40. The recharging system of claim 39 in which the increase in volume of the combustion chamber as a result of the relative movement of the displacer in the second direction is reduced with respect to the decrease in volume of the mixing chamber as a result of the same relative movement of the displacer in the second direction by the volume occupied by the barrier within the volume of the combustion chamber.

41. The recharging system of claim 40 in which the pre-combustion chamber includes a proximal end connected to the main-combustion chamber and a distal end connected to a spark-ignition source.

42. The recharging system of claim 41 in which the pre-combustion chamber includes a plurality of passageways between its proximal and distal ends so that a flame front ignited by the ignition source at the distal end of the pre-combustion chamber propagates along the plurality of passageways as separate flame fronts toward the proximal end of the pre-combustion chamber.

43. The recharging system of claim 38 in which the combustion chamber is divided into a pre-combustion chamber and a main combustion chamber, and the relative movement of the displacer in the first direction decreases a collective volume of the pre-combustion and main combustion chambers for forcing exhaust gases from the collective volume of the pre-combustion and main combustion chambers.

44. The recharging system of claim 43 in which the relative movement of the displacer in the first direction opens an exhaust valve for discharging exhaust gases from the collective volume of the pre-combustion and main combustion chambers.

45. The recharging system of claim 38 further comprising an exhaust valve for discharging exhaust gases from the combustion chamber linked to an initial relative movement of the displacer in the second direction so that the transfer of a portion of the charge into the combustion chamber performs a scavenging function for more completely discharging the exhaust gases from the combustion chamber.

46. The recharging system of claim 38 in which the charge occupying a portion of the decrease in volume of the mixing chamber that exceeds the increase in volume of the combustion chamber is confined within the smaller increase in the volume of the combustion chamber at an increased pressure.

47. The recharging system of claim 38 further comprising a valve system between the mixing chamber and the combustion chamber that permits fluid transfers from the mixing chamber to the combustion chamber but prevents fluid transfers from the combustion chamber to the mixing chamber.

48. The recharging system of claim 47 in which the charge occupying a portion of the decrease in volume of the mixing chamber that exceeds the increase in volume of the combustion chamber accommodates losses in the valve system so that the charge transferred into the combustion chamber remains at or above atmospheric pressure.

49. The recharging system of claim 30 further comprising a cylinder head within which the premixing chamber and the combustion chamber share a combined volume and the relative movement of the displacer with respect to the cylinder head redistributes the shared volume between the premixing chamber and the combustion chamber.

50. The recharging system of claim 49 in which a portion of the shared volume within the combustion chamber is occupied by a structure that limits the volume of the combustion chamber available to receive the transfer of charge from the mixing chamber.

51. The recharging system of claim 50 in which the structure is a barrier that divides the combustion chamber into a pre-combustion chamber and a main combustion chamber.

52. The recharging system of claim 51 in which the barrier occupies a volume that is larger than required to operatively separate the pre-combustion and main combustion chambers to increase the differential volume between the decrease in volume of the mixing chamber and the increase in volume of the combustion chamber as a result of the relative movement of the displacer in the second direction.

* * * * *